Figure 1:
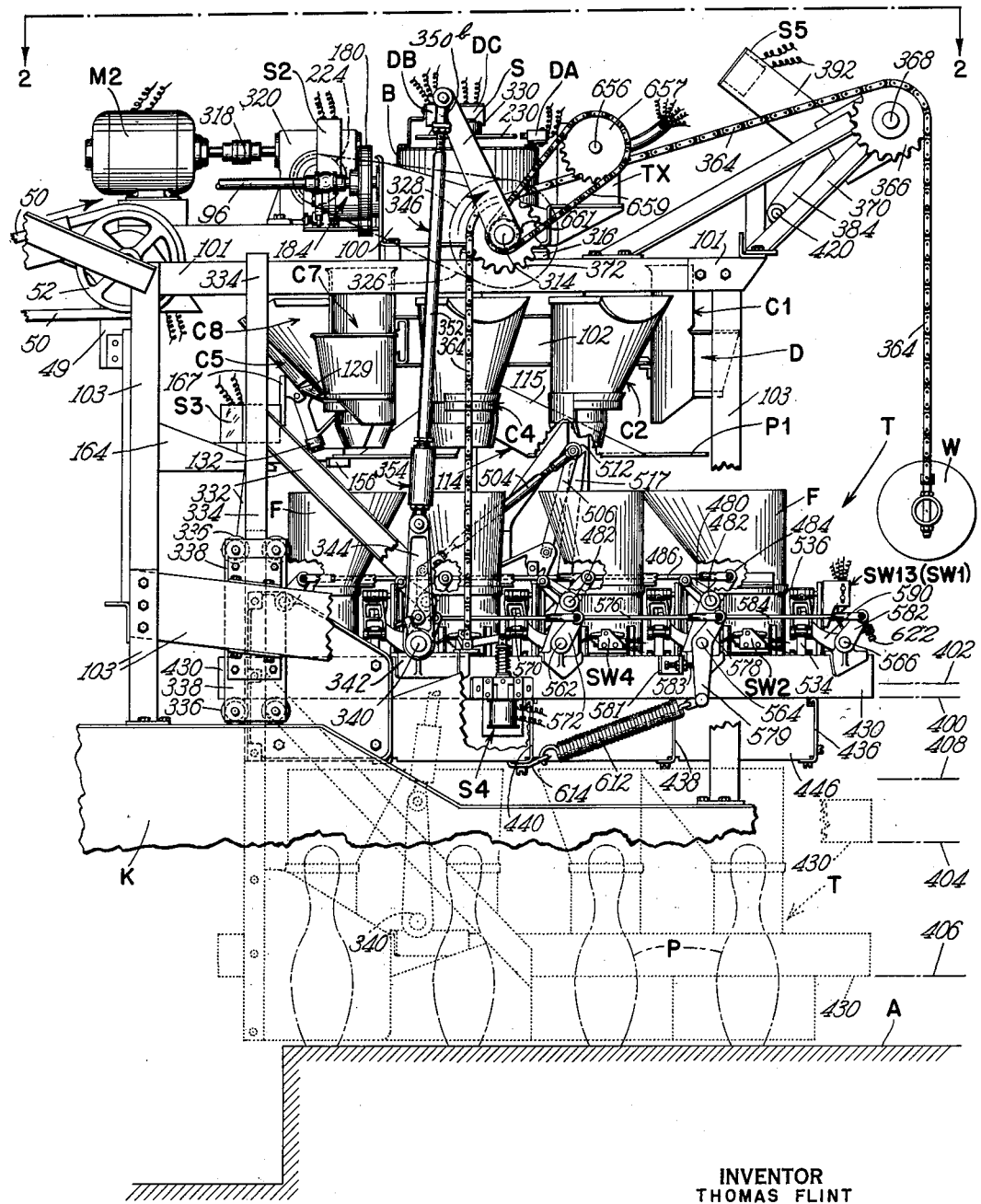

Feb. 28, 1956     J. M. FLUKE ET AL     2,736,554
BOWLING PIN SPOTTING AND RESPOTTING MACHINE
Filed Nov. 12, 1948     16 Sheets-Sheet 1

INVENTOR
THOMAS FLINT
JOHN M. FLUKE
BY
Wentworth & Clapham
ATTORNEY

Feb. 28, 1956 J. M. FLUKE ET AL 2,736,554
BOWLING PIN SPOTTING AND RESPOTTING MACHINE
Filed Nov. 12, 1948 16 Sheets-Sheet 3

INVENTOR
THOMAS FLINT
JOHN M. FLUKE
BY
ATTORNEY

Feb. 28, 1956   J. M. FLUKE ET AL   2,736,554
BOWLING PIN SPOTTING AND RESPOTTING MACHINE
Filed Nov. 12, 1948   16 Sheets-Sheet 4
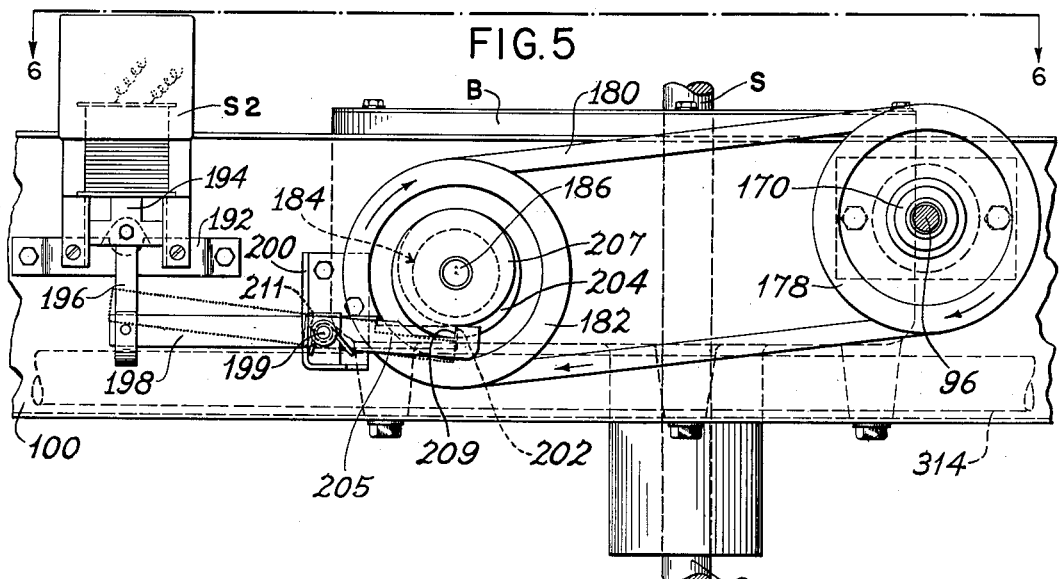
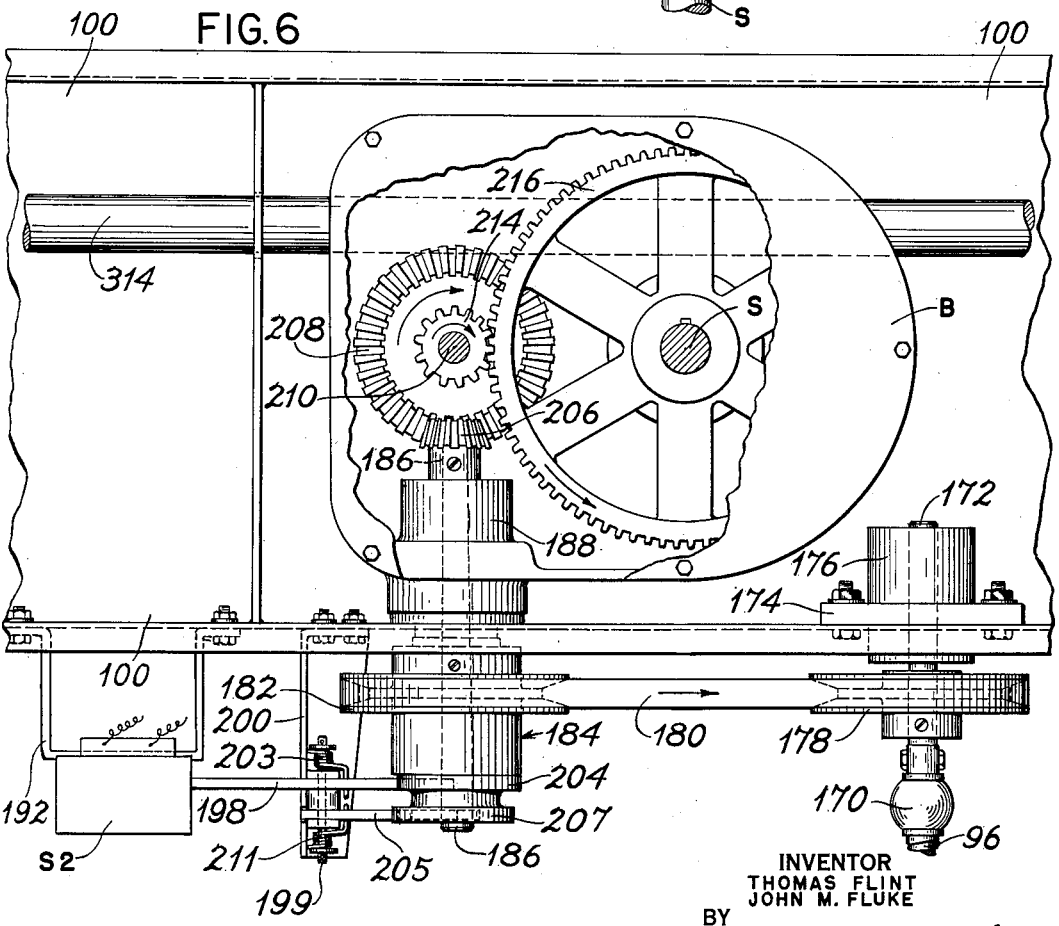
INVENTOR
THOMAS FLINT
JOHN M. FLUKE
BY
Wentworth B. Clapham
ATTORNEY

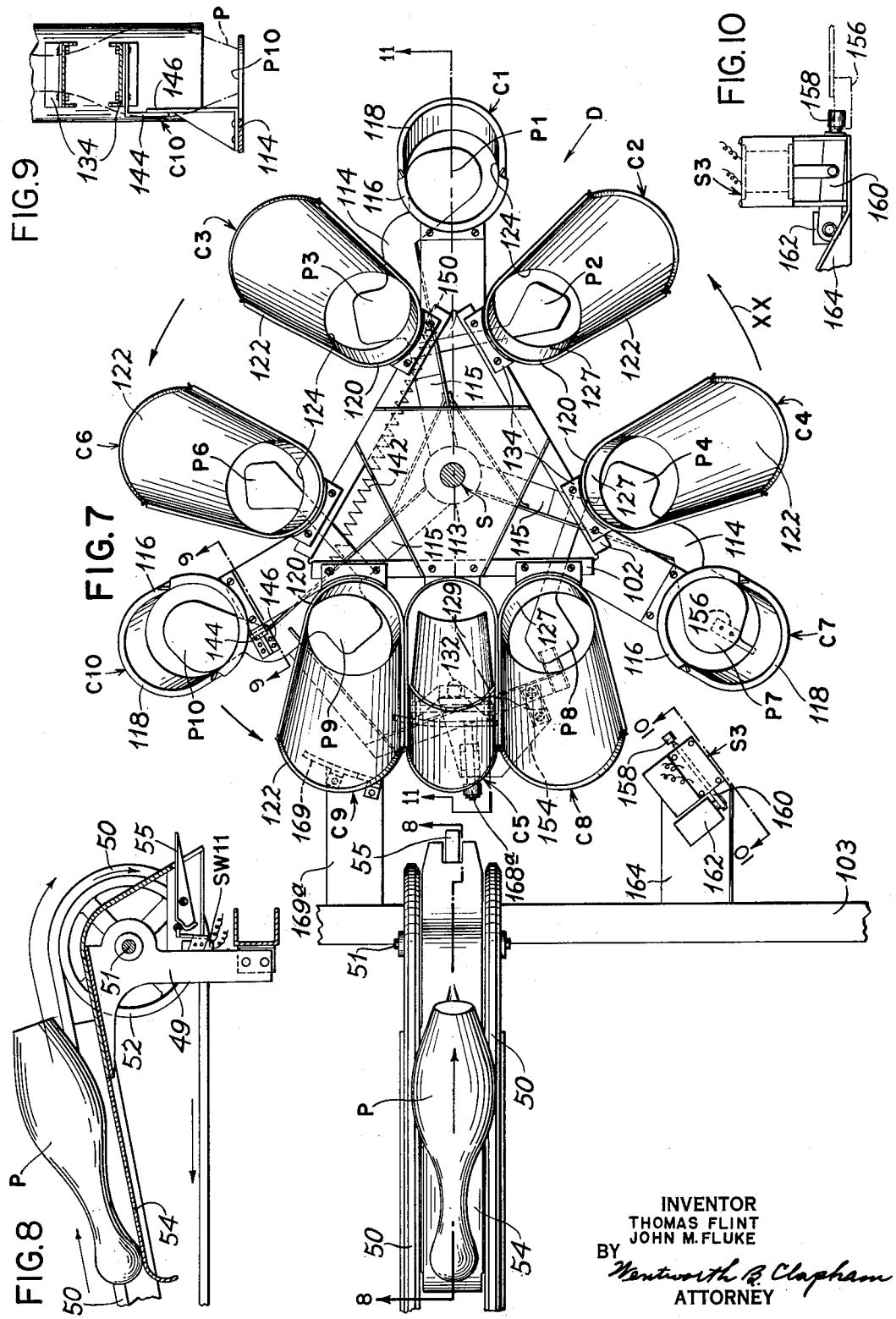

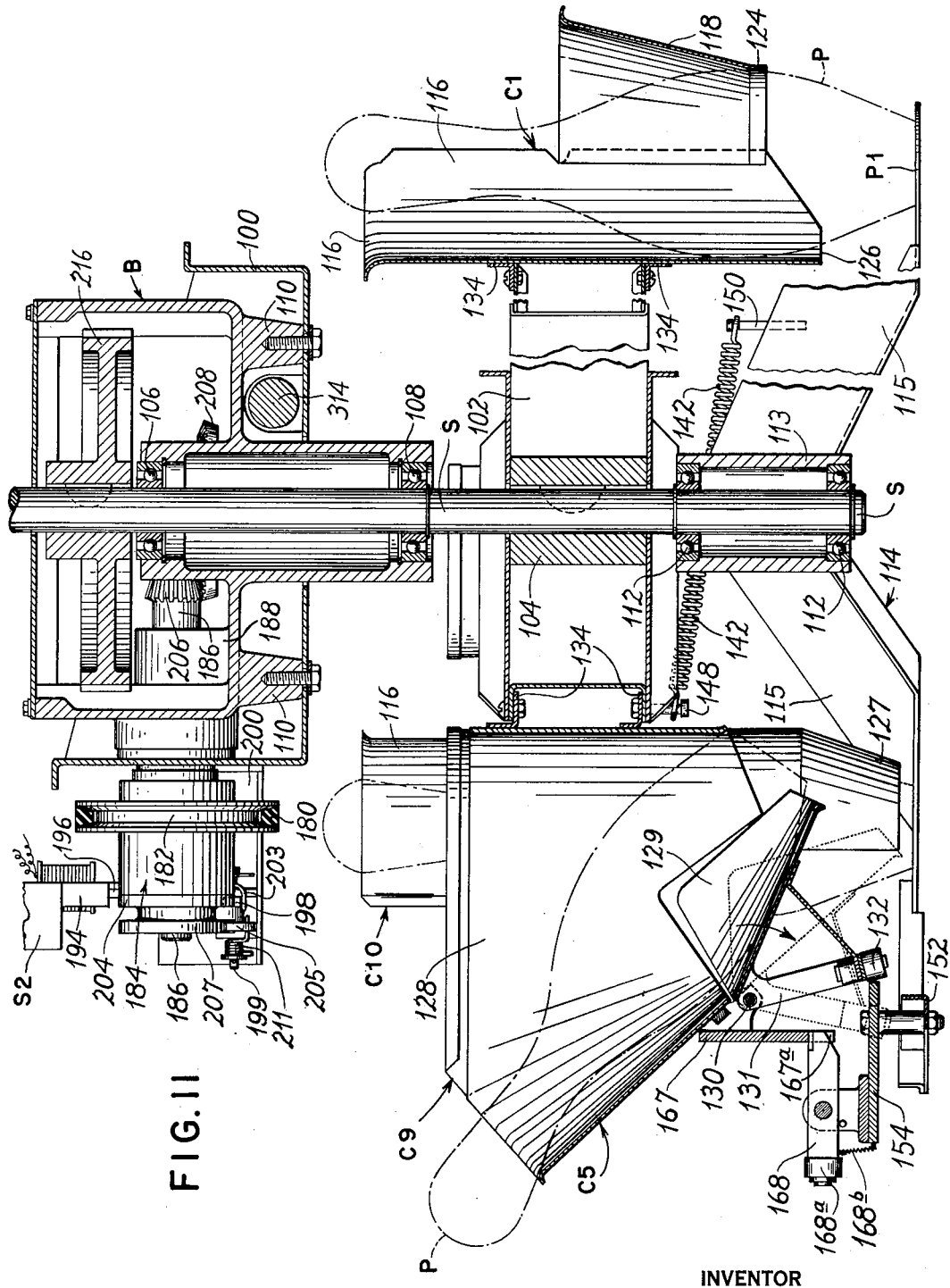

Feb. 28, 1956  J. M. FLUKE ET AL  2,736,554
BOWLING PIN SPOTTING AND RESPOTTING MACHINE
Filed Nov. 12, 1948  16 Sheets-Sheet 7
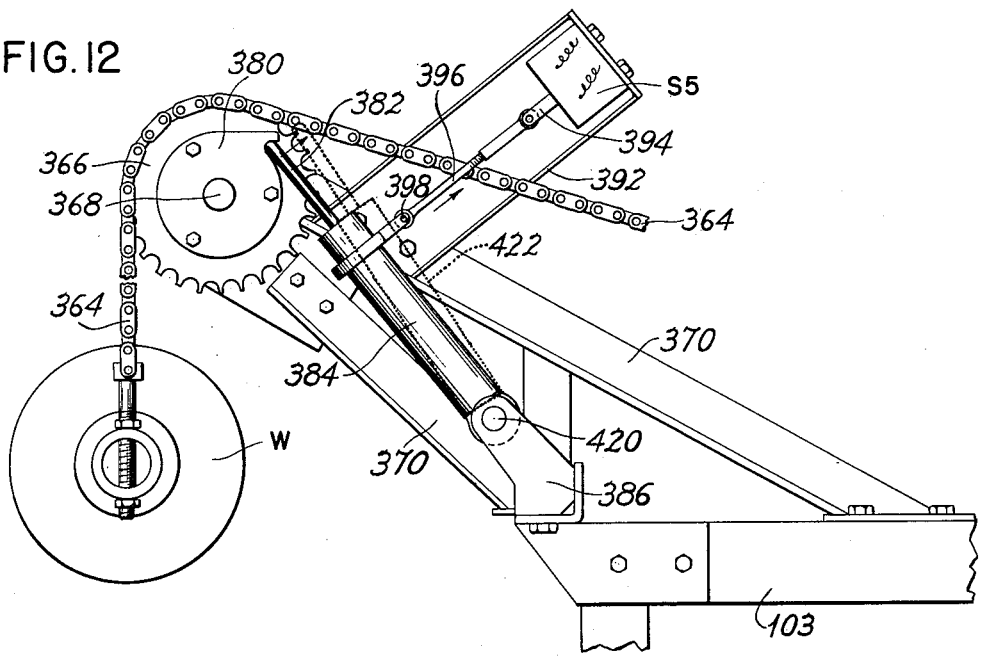
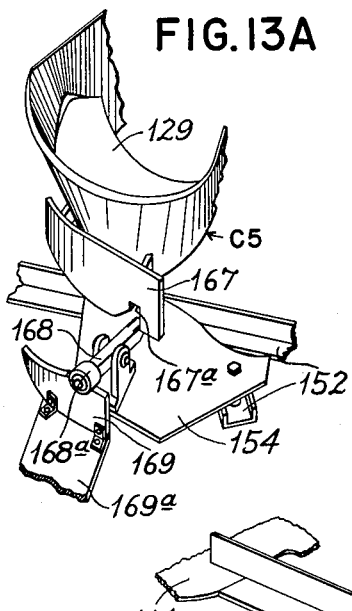
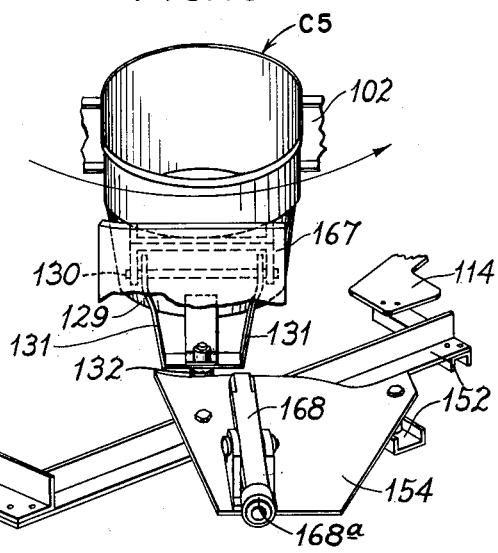
INVENTOR
THOMAS FLINT
JOHN M. FLUKE
BY Wentworth C. Clapham
ATTORNEY

INVENTOR
THOMAS FLINT
JOHN M. FLUKE
BY
ATTORNEY

Feb. 28, 1956  J. M. FLUKE ET AL  2,736,554
BOWLING PIN SPOTTING AND RESPOTTING MACHINE
Filed Nov. 12, 1948  16 Sheets-Sheet 11

INVENTOR
THOMAS FLINT
JOHN M. FLUKE
BY
*Wentworth B. Clapham*
ATTORNEY

Feb. 28, 1956  J. M. FLUKE ET AL  2,736,554
BOWLING PIN SPOTTING AND RESPOTTING MACHINE
Filed Nov. 12, 1948  16 Sheets-Sheet 12

INVENTOR
THOMAS FLINT
JOHN M. FLUKE
BY
Wentworth L. Clapham
ATTORNEY

Feb. 28, 1956  J. M. FLUKE ET AL  2,736,554
BOWLING PIN SPOTTING AND RESPOTTING MACHINE
Filed Nov. 12, 1948  16 Sheets-Sheet 13

INVENTOR
THOMAS FLINT
JOHN M. FLUKE
BY
Wentworth B. Clapham
ATTORNEY

Feb. 28, 1956　　　J. M. FLUKE ET AL　　　2,736,554
BOWLING PIN SPOTTING AND RESPOTTING MACHINE
Filed Nov. 12, 1948　　　　　　　　　　　　　　16 Sheets-Sheet 14

INVENTOR
THOMAS FLINT
JOHN M. FLUKE
BY
*Wentworth B. Clapham*
ATTORNEY

Feb. 28, 1956
J. M. FLUKE ET AL
2,736,554
BOWLING PIN SPOTTING AND RESPOTTING MACHINE
Filed Nov. 12, 1948
16 Sheets-Sheet 15
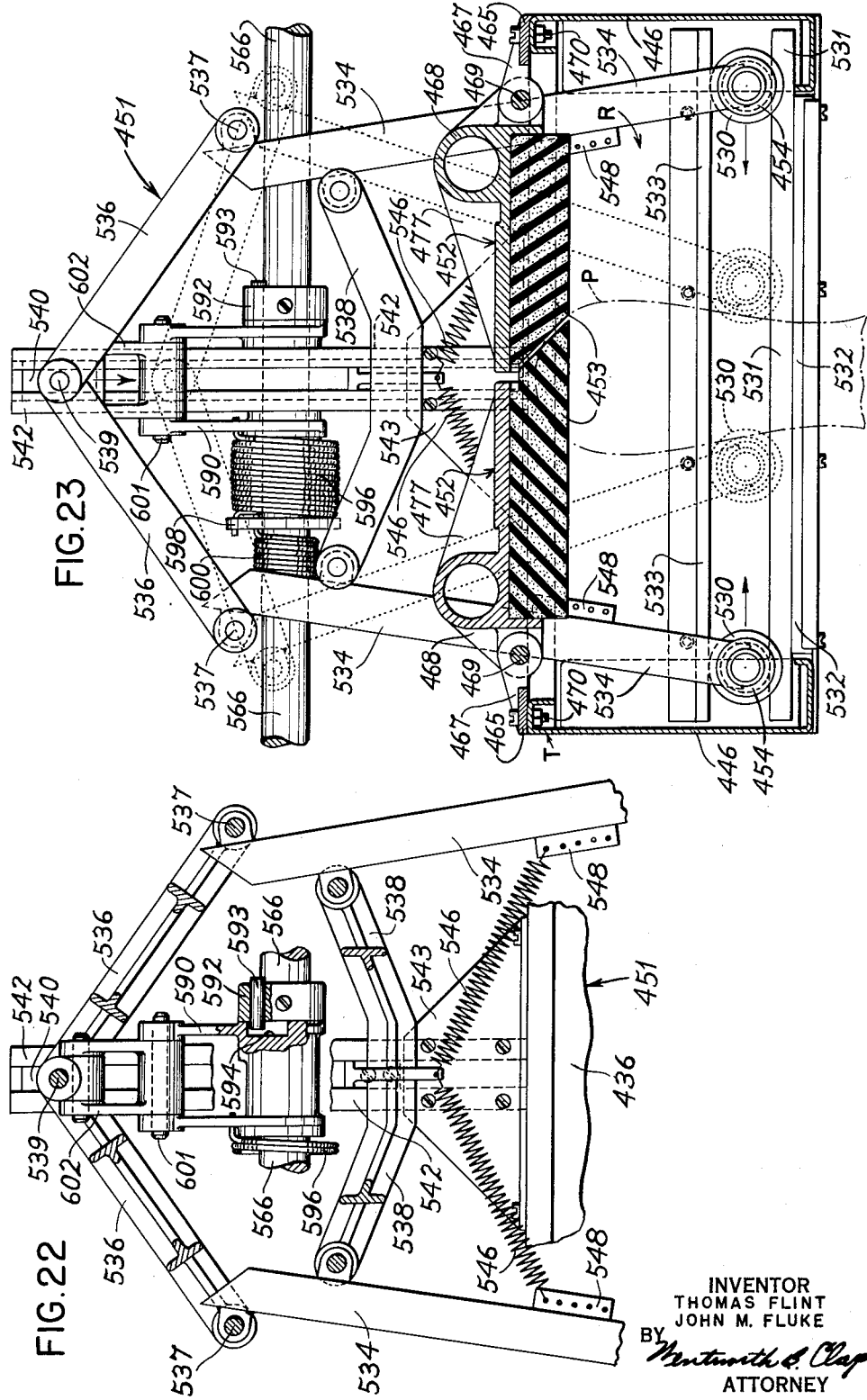
INVENTOR
THOMAS FLINT
JOHN M. FLUKE
BY
ATTORNEY Feb. 28, 1956 J. M. FLUKE ET AL 2,736,554
BOWLING PIN SPOTTING AND RESPOTTING MACHINE
Filed Nov. 12, 1948 16 Sheets-Sheet 16

INVENTOR
THOMAS FLINT
JOHN M. FLUKE
BY
Wentworth B. Clapham
ATTORNEY

United States Patent Office 2,736,554
Patented Feb. 28, 1956

2,736,554

BOWLING PIN SPOTTING AND RESPOTTING MACHINE

John M. Fluke, Springdale, Conn., and Thomas Flint, Concord, Mass., assignors to American Machine & Foundry Company, a corporation of New Jersey Application November 12, 1948, Serial No. 59,706

22 Claims. (Cl. 273—43)

This invention relates to bowling pin spotting machines but more particularly to improvements in mechanisms for distributing and triangularizing pins and mechanisms associated therewith for spotting a set of pins in triangular playing formation on the playing bed of a bowling alley and for respotting pins in their substantially exact on or off-spot positions in order that the play of the game may proceed from frame to frame in the same manner as it would if bowling pins were spotted and respotted manually by a pin boy.

This invention relates generally to automatic bowling pin spotting machines, such for example as the types shown in Rundell Patents 2,388,707 and 2,388,709, issued November 13, 1945, in which bowling pins fall or are delivered into the pit of a bowling alley, and are lifted therefrom and conveyed to mechanisms which distribute the pins and transfer them into devices which at the proper time spot them in playing positions on the bed of a bowling alley. While reference is made to machines such as shown in the above referred to Rundell patents, it is to be understood that the structure of the present invention is not limited to this type of machine, but can be readily adapted for use in other types of automatic bowling pin spotting machines if desired.

The present invention is designed to overcome difficulties heretofore experienced in bowling pin spotting machines, particularly with respect to the orientation, distribution and triangularizing of pins, usually in sets of ten, as is common in a game of tenpins. By means of mechanisms provided by this invention, bowling pins are subjected to less wear and tear. Their orientation and distribution are effected rapidly and they are delivered into triangularly arranged spotting elements in a bowling pin spotting device for placement in proper playing arrangement on the playing bed of an alley.

The structure comprising the invention is relatively simple in construction and operation; it makes possible the rapid spotting and respotting of pins in desired on or off-spot positions on a bowling alley in a minimum of time and with great accuracy.

It is an object of the invention to provide improved automatic mechanism for orienting, distributing and spotting or placing sets of bowling pins on the playing bed of a bowling alley.

The invention also provides spotting mechanism and respotting mechanism which are both assembled on a table adapted to be moved vertically to and from a pin receiving position adjacent the distributing mechanism, and the pin spotting and respotting positions relative to a bowling alley. The spotting and respotting mechanisms are so arranged on the table that they operate from one side thereof and thereby cooperatively with an electromechanical latching mechanism make it possible to use a simple vertical up and down movement in order to effect the two independent operations of spotting and respotting bowling pins on the pin supporting bed of a bowling alley. The invention also includes improved mechanism and control devices for operating the spotting and respotting mechanisms at the proper time in response to the movement of the table to pin spotting and respotting positions relative to the alley.

The invention further consists in the provision of pin spotting mechanism which is constructed to cause the butt ends of bowling pins to project slightly below the bottom of the table when the table nears the playing bed of the bowling alley during the spotting period. The distance a pin projects may vary in accordance with variations in pin diameters and lengths of pins due to the fact that all pins are supported by partly open doors within which the pins are supported and guided and come to rest thereon in accordance with their diameters for proper delivery to the bowling alley. This construction allows the machine to handle a wide range of pin sizes, which may vary lengthwise and transversely. In this manner the machine is equally effective in spotting first quality or "league" bowling pins, or worn pins, such as generally used in "open play," which may have been turned down and shortened or repaired in order to prolong their life.

The invention further consists in the provision of a bowling pin spotting and respotting table which is so designed that it can be located very close to the alley bed in order that pins to be spotted are held under positive control of the spotting members until they practically touch the table. In this way applicants insure maximum accuracy in spotting with a minimum of noise, as compared with prior bowling pin spotting machines in which pins are dropped a considerable distance after their release from their supporting means in the spotting table. According to applicants' construction, the release of pins to be spotted and respotted is effected easily and relatively slowly because of the provision of a driving crank arm which swings crosswise as the table is lowered towards the alley imparting substantially a simple harmonic motion to the table, thus reducing the lowering speed of the vertical travel of the table and insuring that pins to be spotted or respotted will be placed gently upon the alley.

The invention is further characterized by the provision of a simplified control in which there is provided mechanism, such as latch-type relays, which render the operation of the machine unaffected by power failures. These latch relays are not affected by power failure since they are mechanically held in the position they were last caused to take making the machine thereby able to continue its full natural operative cycle from the point of interruption when power is again restored in order to complete a full operating cycle. This is particularly effective in all circuits requiring memory functions because in circuits using simple relays which are de-energized when power fails, such circuits are broken as the relays fall out, thus causing the loss of sequence control. This situation cannot obtain with the control mechanism disclosed herein.

With these and other objects not specifically mentioned in view, the invention consists of certain combinations and constructions which will be hereinafter fully described, and then set forth in the claims hereunto appended.

Figure 2:
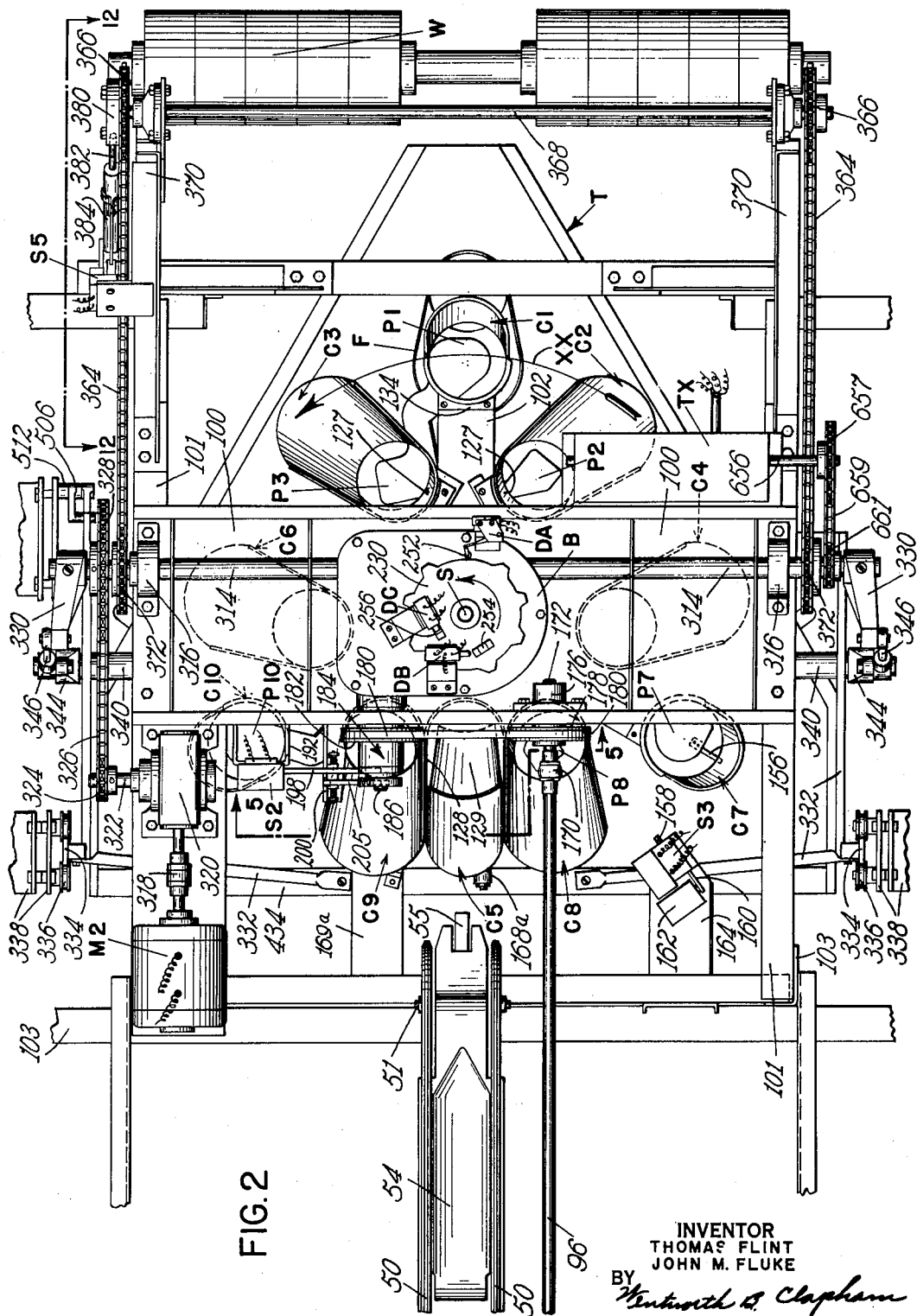
Figure 3:
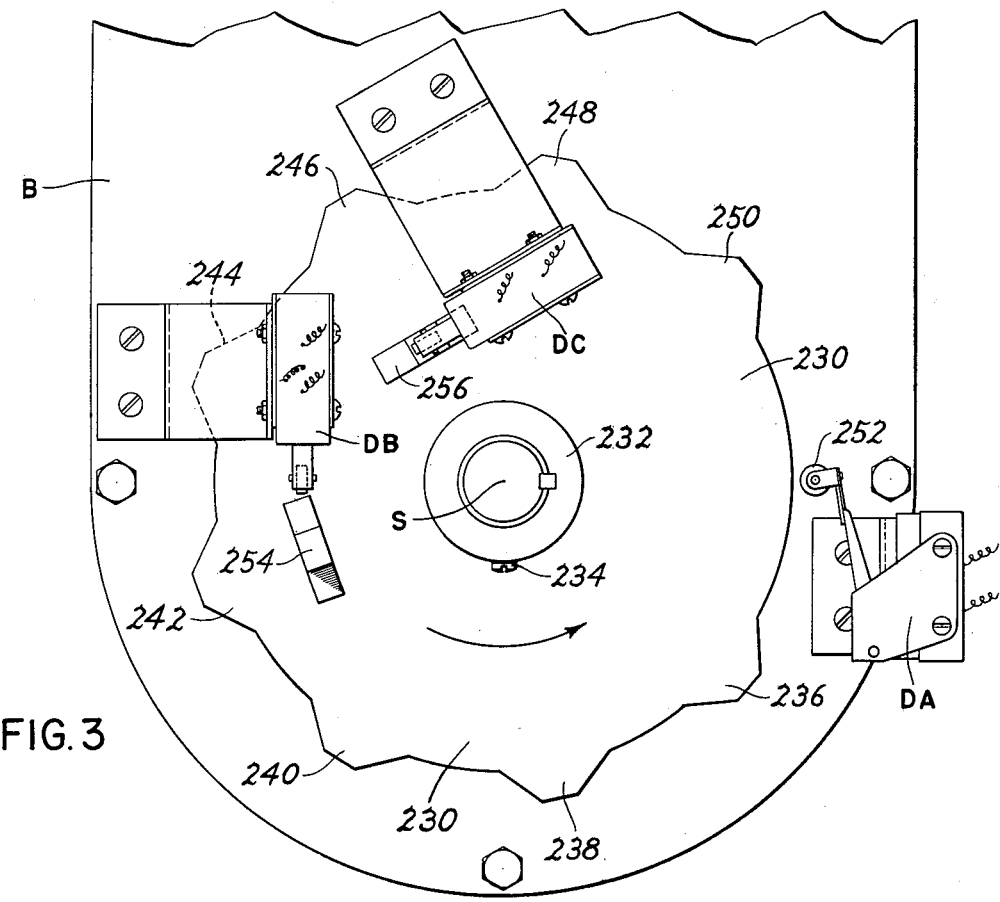
Figure 4:
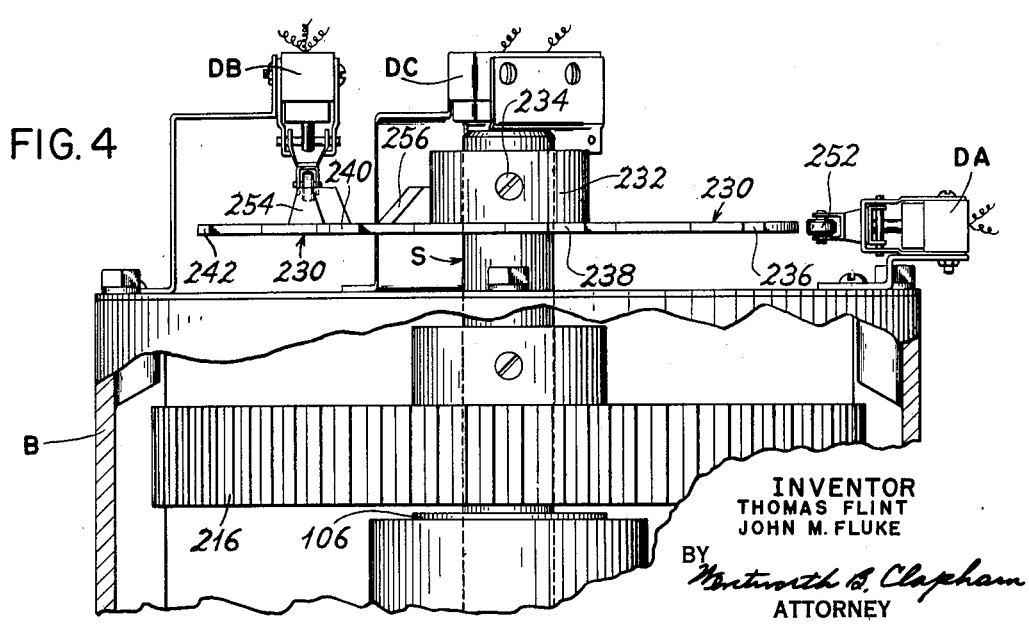
Figure 14:
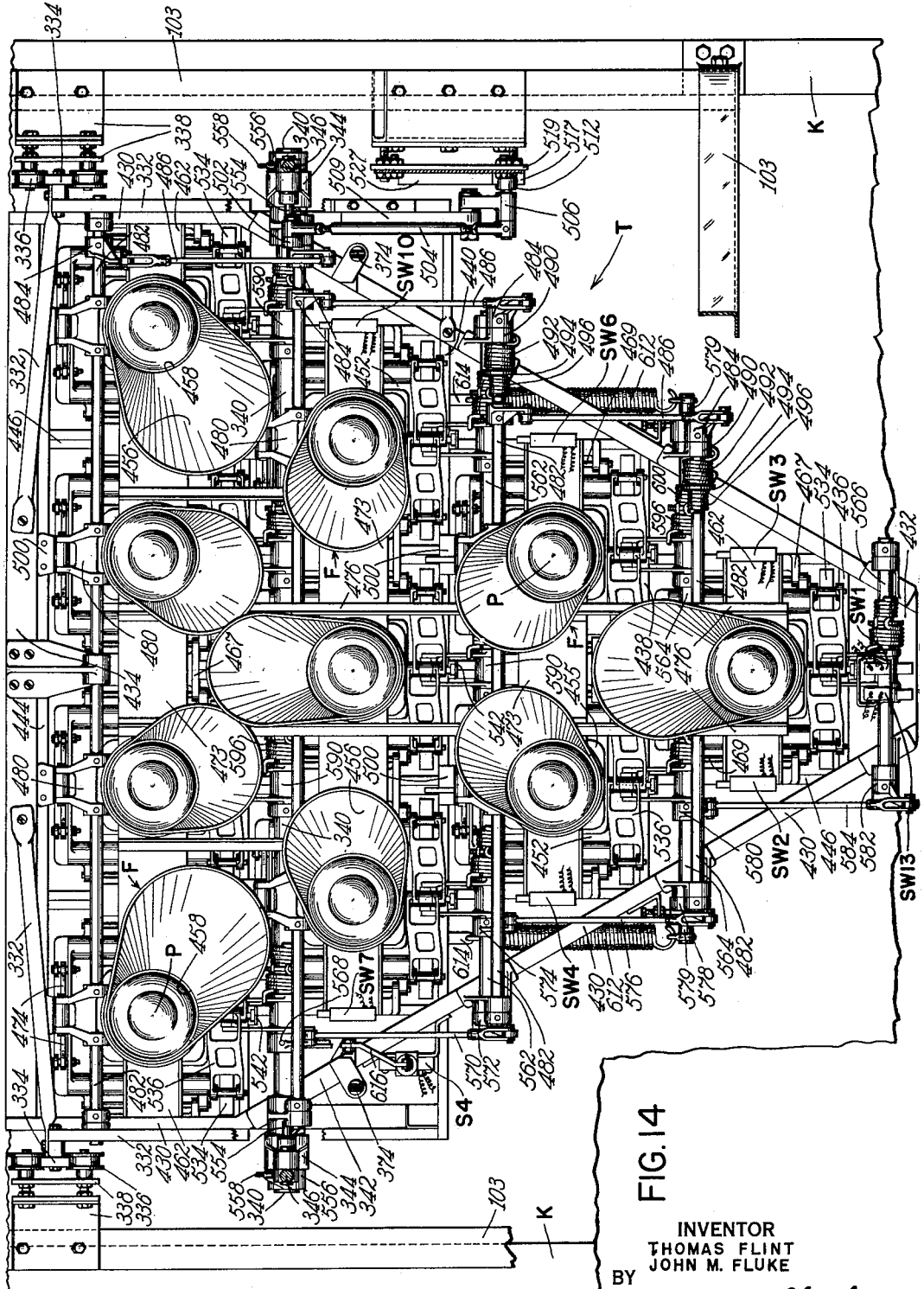
Figure 15:
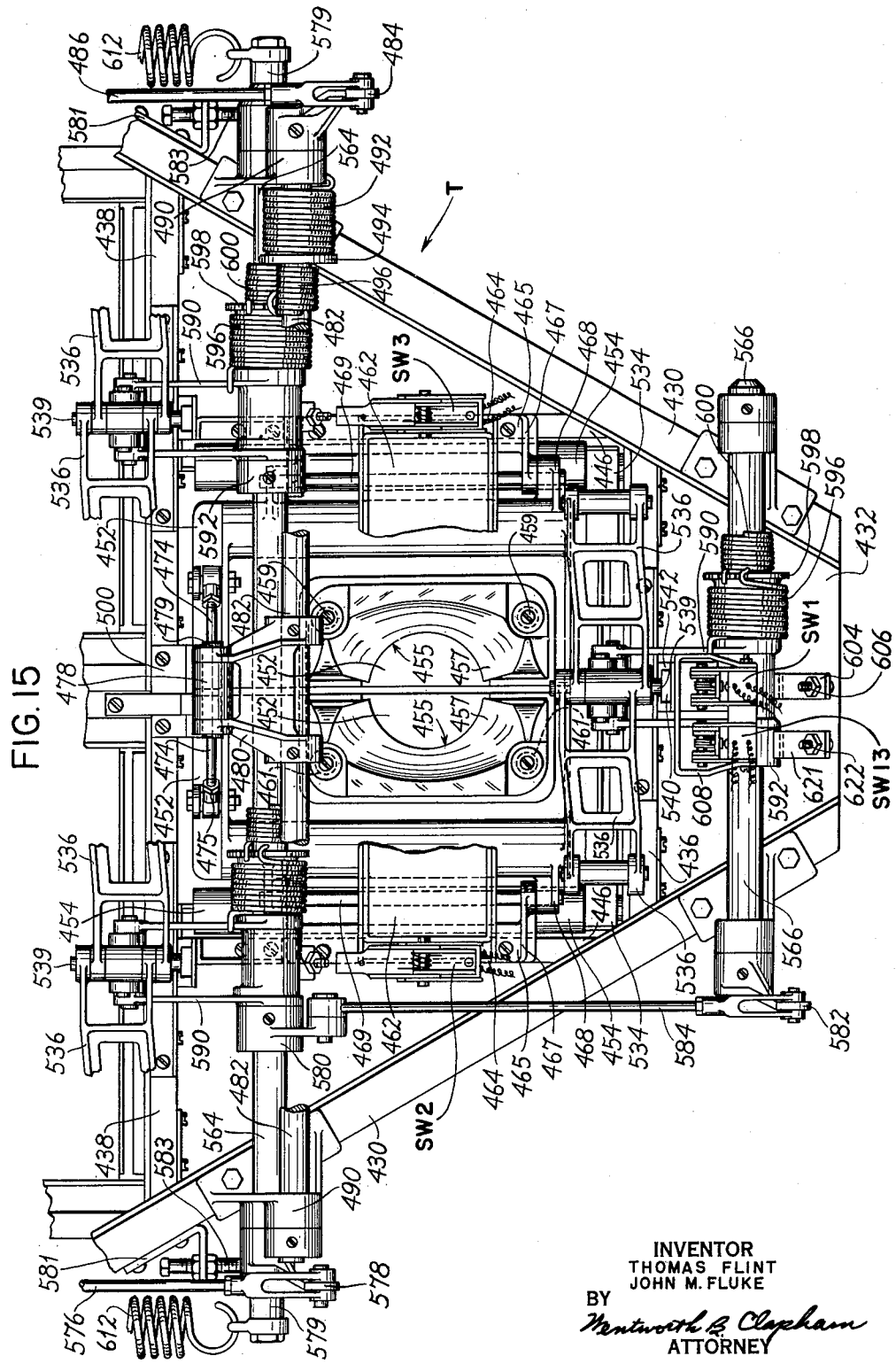
Figure 16:
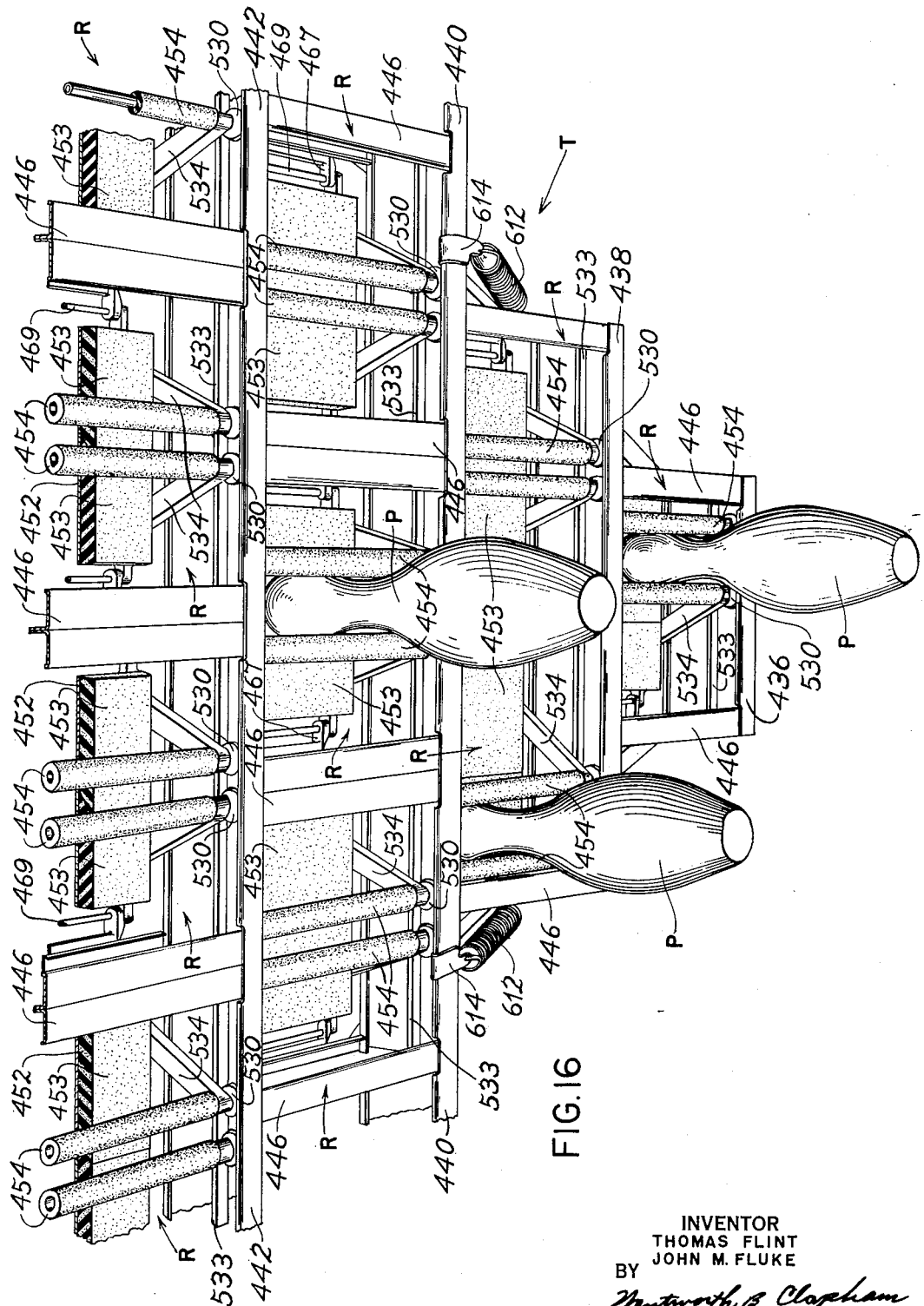
Figure 17:
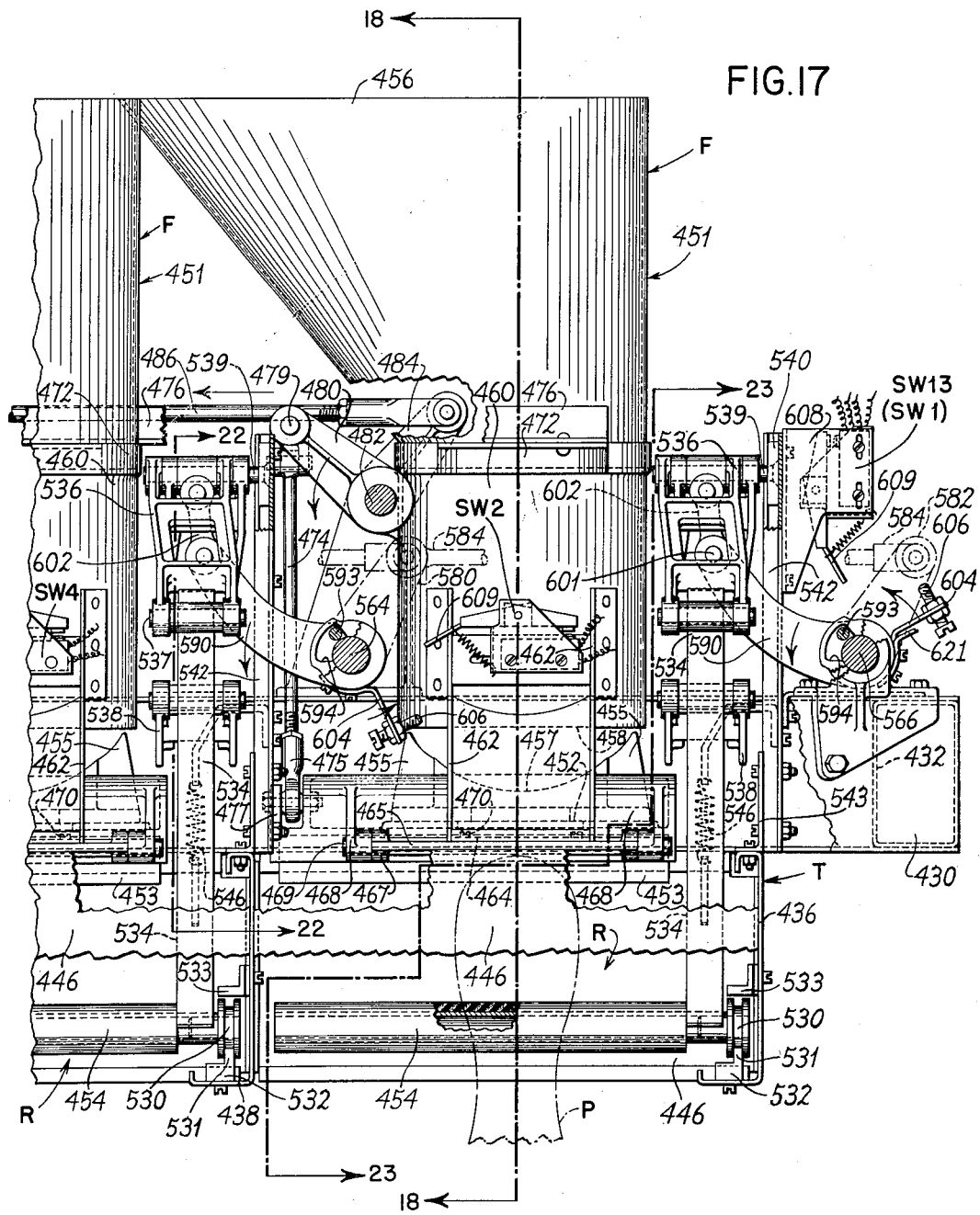
Figure 18:
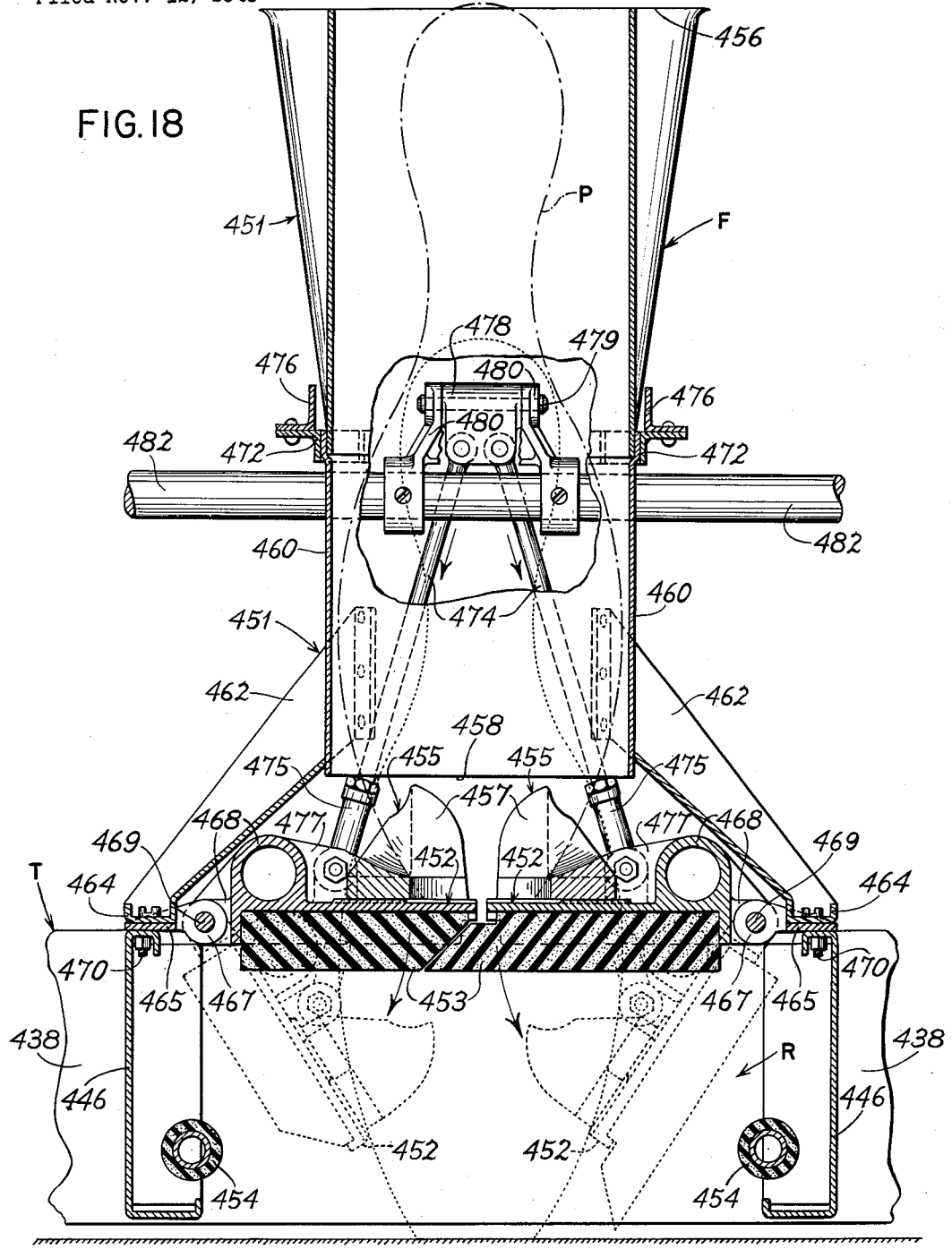
Figure 19:
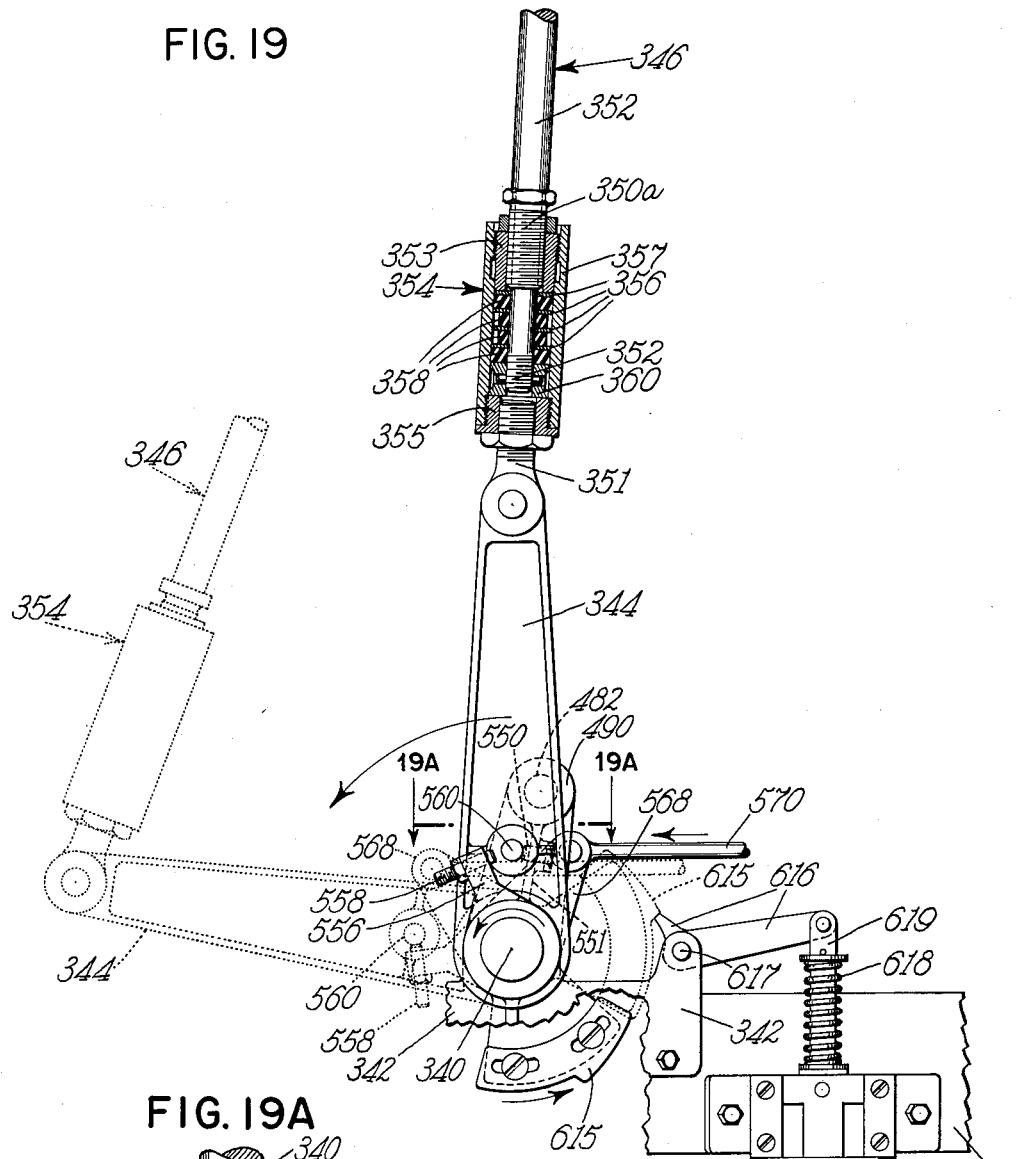
Figure 19A:
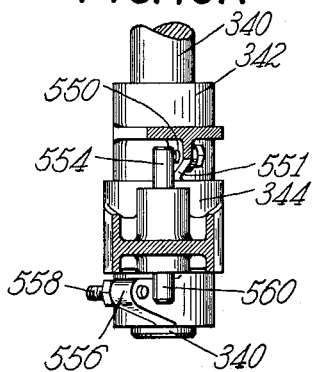
Figure 20:
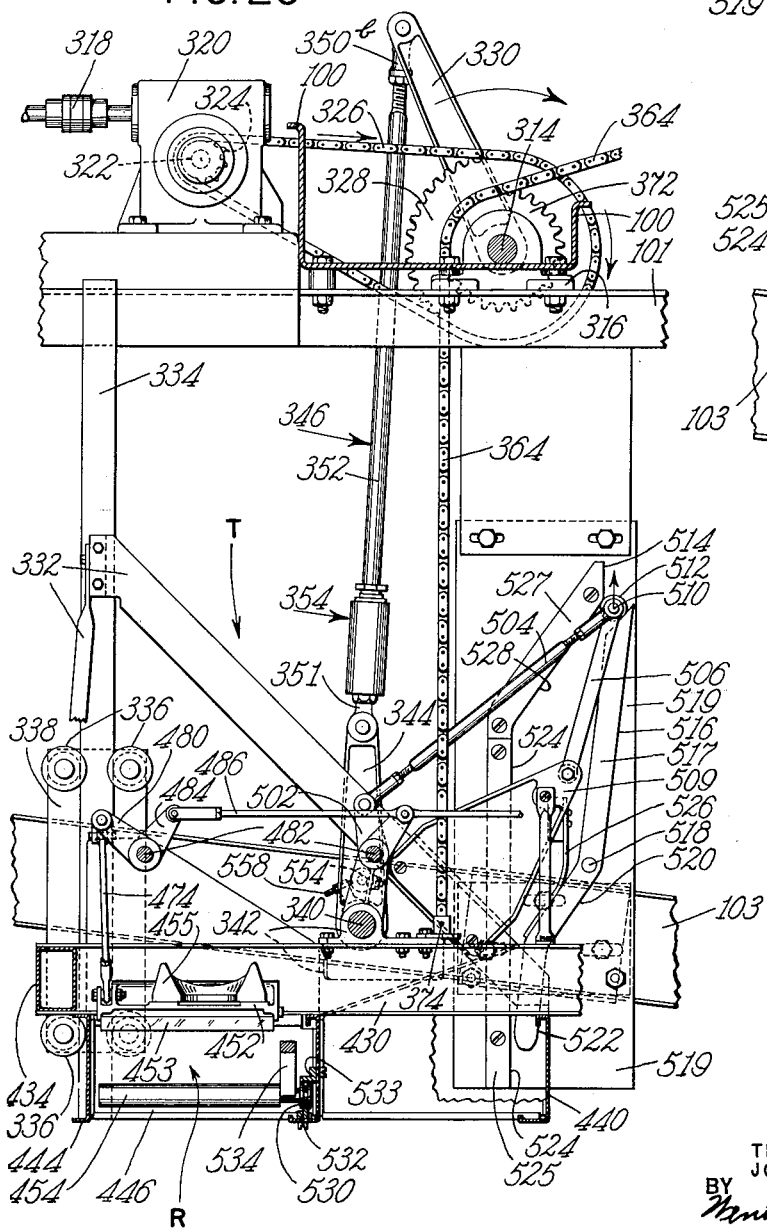
Figure 21:
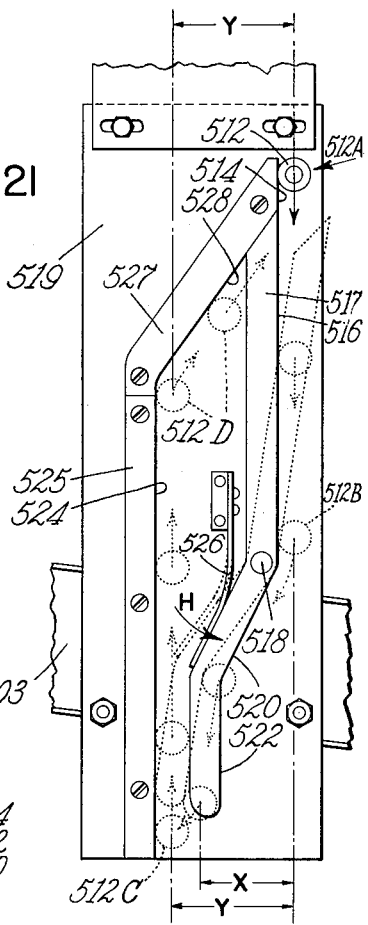
Figure 24:
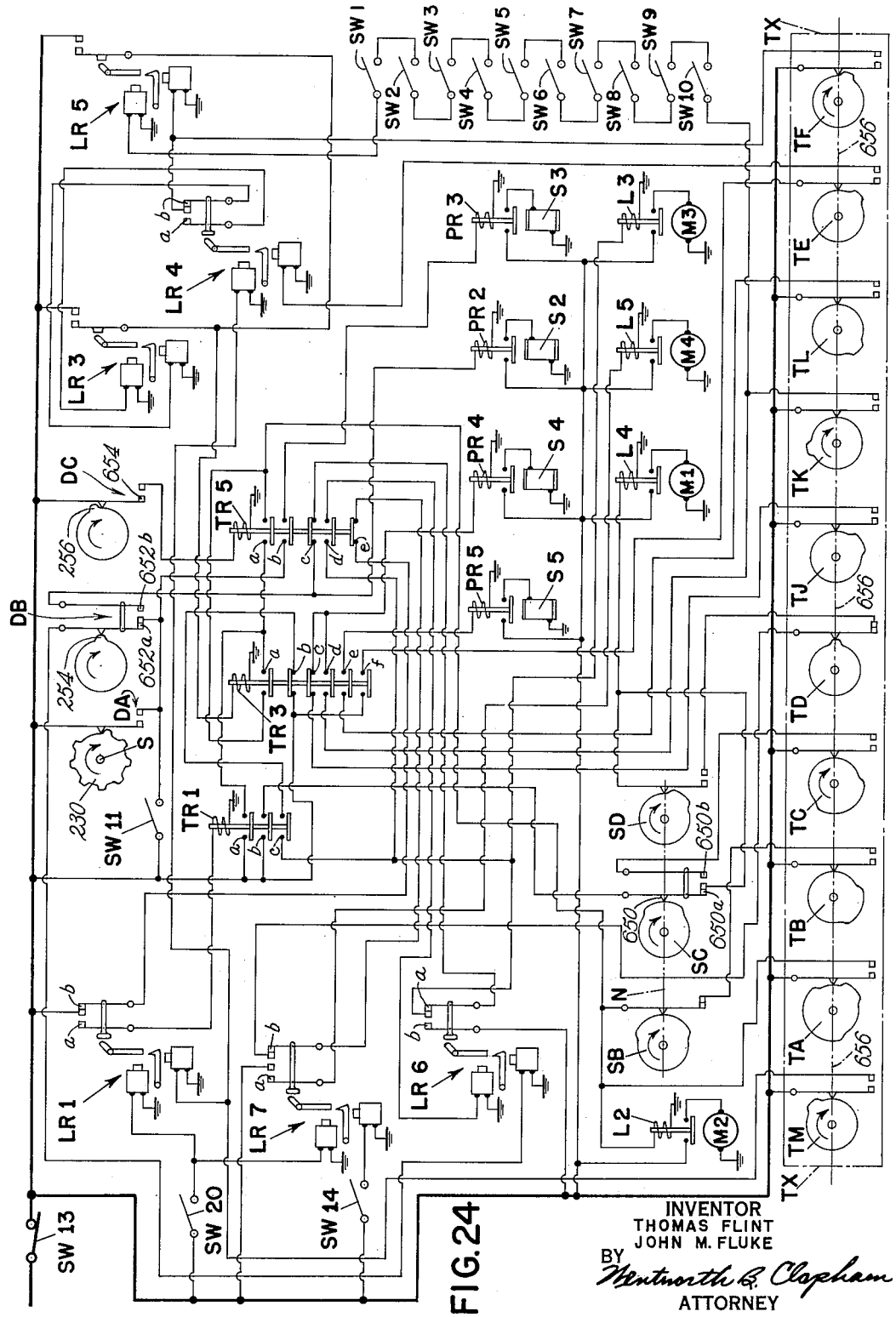

In the accompanying drawings which form a part of this specification, and in which like characters of reference indicate the same or like parts:

Figure 1 is a side elevation of the bowling pin setting machine showing the pin distributor in conjunction with the pin spotter and respotter table, Figure 2 is a plan view of the machine showing the pin distributor and its driving mechanism, and the driving mechanism for the pin spotter table, Figure 3 is a detailed plan view showing the gear box and electrical cam switch controls of the pin distributor, Figure 4 is a side elevation, partly in section, of the same, Figure 5 is a detailed rear elevation of the distributor clutch control mechanisms as seen from line 5—5 of Figure 2, Figure 6 is a plan view of the same, taken on line 6—6 of Figure 5, Figure 7 is a detailed plan view of the pin distributor in conjunction with a pin supplying conveyor, Figure 8 is a sectional side elevation of the pin supplying conveyor taken on line 8—8 of Figure 7, Figure 9 is a sectional side elevation, taken on line 9—9 of Figure 7, illustrating in detail the stop arrangement between the pin funnels and pin supporting member of the pin distributor, Figure 10 is a side elevation of the electrically controlled arresting mechanism for the pin supporting member of the distributor, taken on line 10—10 of Figure 7, Figure 11 is a sectional side elevation of the pin distributor, taken on line 11—11 of Figure 7, Figure 12 is a side elevation of the pin setter table control mechanism taken on line 12—12 of Figure 2, Figure 13 is an isometric front elevation of the number 5 distributor funnel illustrating in detail the trap door operating mechanism, and spider latch, Figure 13A is an isometric view of the spider locking mechanism during its unlatching action, Figure 14 is a plan view of the pin spotting-respotting table, Figure 15 is a plan view of a single cell or spotting-respotting unit, Figure 16 is an isometric bottom view of the table illustrating the respotting or pin gripper mechanisms during pin gripping action, Figure 17 is a side elevation, partly in section, of a single spotting-respotting unit of the table, Figure 18 is a sectional end elevation of the same, taken on line 18—18 of Figure 17, Figure 19 is a detailed side elevation of the pin gripper control mechanism, Figure 19A is a sectional plan view on line 19A—19A of Figure 19, Figure 20 is a detailed side elevation of the pin spotting mechanism for placing new sets of pins on the alley, Figure 21 is an enlarged detailed side elevation of the cam control mechanism for the same, Figure 22 is a partial end elevation of the pin gripper linkage construction, Figure 23 is a detailed sectional end elevation of a single unit of pin grippers taken on line 23—23 of Figure 17, and Figure 24 is a wiring diagram showing a preferred system for controlling the operation of the several coacting mechanisms.

The mechanism constituting the present invention is particularly adapted for use with the bowling pin setting machine structure disclosed in copending application S. N. 34,695, filed June 23, 1948, by Henry W. Phillips, for Bowling Pin Setting Machines, now Patent 2,686,053 granted August 10, 1954. As disclosed in the Phillips application, bowling pins are removed from the pit of a bowling alley and delivered to pin conveying mechanism which conveys them to distributing mechanism forming a part of the invention.

Pin distributing mechanism

Referring to Figures 1, 2, 7 and 8, there is shown a distributor designated generally D arranged above the pin spotting and respotting table T. Bowling pins to be distributed are delivered one by one in succession from a suitable source, such as shown in the Phillips application hereinabove referred to, in such manner that they are free to fall one by one into distributor D at a selected point or station. A preferred means for delivering pins in succession to distributor D consists of spaced endless driven belts 50 which run on spaced pulleys 52 secured to driven shaft 51 journaled in spaced brackets 49 secured to the frame of the machine.

Belts 50 are spaced apart a distance sufficient to allow them to engage the body of a pin and move it forwardly from the back end of the machine (not shown) to a point of discharge adjacent one of the cups C of distributor D. Each pin delivered to distributor D is engaged by the upper runs of belts 50 approximately at its point of maximum diameter and carried forwardly from the rear of the machine towards distributor D. As each pin travels forwardly, due to the manner in which it is engaged by belts 50, its head end usually depends downwardly. However, in order to insure that each pin will be delivered butt end forward, there is provided between the upper runs of belts 50, as shown in Figure 8, and therebelow, a guiding and positioning plate 54. As each pin is conveyed by the upper runs of belts 50, the head end thereof rests on and is supported by plate 54 so that it is properly arranged or oriented for delivery from belts 50 into a cup C of distributor D.

As each pin is discharged from belts 50, it engages a switch actuator 55 which when so engaged, operates switch SW11 positioned at the loading or pin receiving station of distributor D. When switch SW11 is operated in this manner, it causes a step by step rotation of distributor D in order to position each empty cup C, of which there are ten, designated C1–C10 inclusive, in succession at the loading or pin receiving station for delivery of a pin thereto by belts 50.

As shown in Figure 1, distributor D is disposed between spaced upright side frames 103 of the machine and is conveniently supported on a transverse channel 100 forming a part of a horizontal frame 101 attached at its opposite ends to the top members of the respective side frames 103 of the machine which in turn are fastened to the kickbacks K of bowling alley A.

As stated above, distributor D is provided with ten pin receiving cups C, designated C1–C10 inclusive. This number of cups corresponds to the number of pins customarily forming a set or frame of pins. It is obvious that if desired, more or less cups could be provided, or it would be possible to select only a portion of the ten cups to fill with pins. In the illustrated embodiment, the ten cups C are mounted on a horizontal supporting frame 102 secured to sleeve 104 keyed to a vertical shaft S. This shaft is mounted in upper and lower bearings 106, 108 (Figure 11) in a gear box B enclosing the upper portion of shaft S. Box B is attached by lugs 110 to the web of cross channel 100. It will be seen, therefore, that in effect, distributor B is carried solely by shaft S through the connections described.

Beneath frame 102, shaft S rotatively supports on bearing 112 a hub 113 of a pin supporting spider 114 provided with a plurality of radial arms 115 having platforms P1–P4 inclusive and P6–P10 inclusive, which are operatively associated with cups C1–C4 inclusive and C6–C10 inclusive of distributor D in a manner to support and retain pins in these cups during the collection of a set of ten pins in distributor D and until they are delivered therefrom. At the appropriate time, relative separating movement between frame 102 and spider 114 effects the discharge or release of all pins in cups C1–C10 inclusive substantially simultaneously through the bottom of the cups directly into triangularly arranged pin spotting devices or funnels F of spotting-respotting table T, as described hereinafter.

Distributor cups C1–C10, as illustrated, are of three different forms. Cups C1, C7, and C10 each comprises a substantially upright semi-cylindrical half section 116, to the inner side edges of which is attached a relatively short flaring section 118. Cups C2, C3, C4, C6, C8, and C9 are of offset funnel or flaring form such that each of these cups has one-half or the inner portion thereof of semi-cylindrical form, as indicated at 120 in Figure 7. The remaining portion 122 of each of these cups flares progressively downwardly and inwardly from the top.

In both sets of cups described thus far, the lower end of the flaring portions 118 and 122 respectively, terminates in a short semi-cylindrical section which, with the opposed adjacent portion of the remaining section 116 or 120, forms a circular bottom or mouth 124—see Figures 7 and 11. All the mouths 124 are of a diameter only slightly larger than the maximum diameter of a pin. Because of this construction, when pins are standing in the cups supported by their respective platforms P1–P4 and P6–P10, such as shown in Figure 11 for example, the maximum diameter of each pin supported is closely encircled by the circular mouths 124 of these cups, whereby the pins are held in substantially upright position supported by the pin supporting platforms of spider 114. It will be noted that in cups C1, C7, and C10, the lower portions of their sections 116 extend below the cylindrical mouth portions 124, as indicated at 126 in Figure 11, the inner edges of these lower portions being cut off diagonally as shown. Similarly, portions 120 of cups C2, C3, C4, C6, C8, and C9 have downwardly tapered extensions 127 projecting inwardly, disposed beneath circular mouth portion 124 thereof. The projections 126 and 127 assist in guiding pins, when discharged from the cups mentioned, into their respective funnels F on table T. These projections also prevent the pins from being carried with the platforms P allowing the platforms to slide out from under the pins during intended relative motion between platforms P and cups C. Platforms P are preferably made of steel surfaced with laminated plastic and/or rubber to reduce noise and wear.

Cup C5 is used for directing a pin to the number 5 position or center spot of the required triangular pin pattern. The overall shape of cup C5, as illustrated in Figure 11, is generally the same as that of cups C2 and C3, except that its opposite side walls 128 are parallel. Cup C5 is located in the space between cups C8 and C9 and is therefore closer to said cups than the remaining cups are to each other. Pivotally attached at 130 to the lower edge of the front inclined wall of cup C5, is a trap door 129 which normally is held in closed position by a cam 154, to be described hereinafter, so that a pin in cup C5 is held in the inclined position illustrated in Figure 11.

Referring to Figure 7, it will be seen that the longitudinal axes of the several cups C1–C10 inclusive are disposed along lines forming a substantially equilateral triangle with the axis of each of the cups C1, C7 and C10 located at an apex of the triangle. The triangle, however, is of somewhat smaller dimensions than the triangle defining the pattern in which the pins are arranged in the several pin setting devices F for deposit on alley A therebelow.

As mentioned hereinabove, shaft S is driven intermittently in order to move cups C1–C10 inclusive to and from pin delivery position adjacent the discharge end of pin conveying belts 50. The drive for shaft S is obtained from a shaft 96, preferably rotating continuously (see Figures 1, 2, 5 and 6) and driven from a motor (not shown). Shaft 96 is attached by means of a suitable coupling 170 to jack shaft 172 mounted in bearings 174 secured to fitting 176 attached to the rear vertical flange of channel 100. Mounted on jack shaft 172 is a pulley 178 about which runs a belt 180 tracking pulley 182 fixed to the driving section of a one-revolution clutch 184 which can be of any well known standard type, such as a #2 Hilliard clutch. The driven element of clutch 184 is secured to shaft 186 which is supported in bearings 188 of gear box B mounted on channel 100.

Clutch 184 may be caused to impart a single revolution to shaft 186 by means of an intermittently actuated solenoid $S_2$ mounted on bracket 192 attached to a vertical flange of channel 100. Armature 194 of solenoid $S_2$ is connected by link 196 to a latch lever 198 pivoted at 199 on bracket 200 also secured to channel 100.

The free end of lever 198, as shown in Figure 5, is engageable with a stop shoulder 202 on clutch cam 204, and when so engaged, clutch 184 is disconnected and no drive is imparted to shaft 186. When solenoid $S_2$ is energized momentarily, lever 198 is disconnected from shoulder 202 of clutch cam 204, whereupon the clutch is thrown in and shaft 186 is driven in a clockwise direction as shown in Figure 5. As soon as solenoid $S_2$ is de-energized, spring 203, which encircles pivot 199 and has one end pressing against lever 198, urges lever 198 back into engagement with stop shoulder 202 of cam 204, thereby disengaging clutch 184 when shoulder 202 abuts the end of lever 198. Pivot 199 also swingably supports a latch lug 205, the free hook-shaped end of which engages with a cam 207, which may be integral with cam 204, mounted on shaft 186. Cam 207 is provided with a stop shoulder 209, Figure 5. A tension spring 211 also encircling pivot 199 and acting upon latch lug 205 assures a constant contact of the latter with cam 207 and causes the hook shaped free end of lug 205 to engage with stop shoulder 209 of cam 207 after each revolution of clutch 184, thus preventing any reverse motion of the distributor when lever 198 re-engages stop shoulder 202.

As described more in detail hereinafter, the indexing of distributor frame 102 is such that each empty cup is presented for filling at the pin receiving station adjacent the delivery end of conveying belts 50 in proper timed relation. In order to effect the step-wise rotation of shaft S and bring succeeding cups C1–C10 in line with conveying belts 50, the number of revolutions of clutch 184 varies and is as follows: From cup C5, the first cup to be filled, located at the pin receiving station, to cup C9, the next cup to be filled, one revolution. In indexing cups C9, C10, C6, C3, C1, C2, C4, C7 and C8, two revolutions of clutch 184 are required to present each of these cups in proper sequence for delivery of a pin thereto. In moving cups C8 and C5 into pin delivery position, one revolution of clutch 184 is required. The distance traveled by these cups during each revolution of clutch 184 is obtained by the proper selection of the ratios of the gears 206, 208, 214 and 216, Figure 6, in accordance with the cup spacing on the distributor.

As previously stated, as each pin is delivered from conveying belts 50 into a distributor cup C, it engages actuator 55 which causes an actuation of switch SW11 which results in the energization of solenoid $S_2$, thereby effecting a partial rotation of shaft S in order to index and bring succeeding cups into line with the ends of conveying belts 50. This action, while initiated by switch SW11, is further controlled by a cycling cam and related switches to be described more in detail hereinafter in such a manner as to accomplish either one or two revolutions of clutch 184 as noted above.

Figures 6 and 11 disclose mechanism for driving shaft S. This includes a bevel gear 206 attached to driven shaft 186 at the remote end of clutch 184. Gear 206 meshes with a bevel gear 208 mounted on a vertical shaft 210 which is mounted in suitable bearings (not shown) in the upper and lower portions of gear box B. Also attached to the upper portion of shaft 210, above bevel gear 208, is a spur gear 214 engaging with a larger spur gear 216 on shaft S. The ratio of the bevel gears 206 and 208 effects a 3 to 1 reduction, and the ratio of spur gears 214 and 216 effects an additional reduction of 6 to 1. The overall result is a reduction or drive ratio of 18 to 1 between clutch 184 and shaft S. Therefore, in view of the summation of the required revolutions of clutch 184 as noted above, it is evident that 18 revolutions of clutch 184 are required in order to complete one distributing cycle of shaft S and distributor frame 102 attached thereto which supports pin holding cups C1–C10 inclusive.

The number of revolutions required is tabulated as follows:

| Indexing movement | | Revolutions |
|---|---|---|
| From— | To— | |
| C5 | C9 | 1 |
| C9 | C10 | 2 |
| C10 | C6 | 2 |
| C6 | C3 | 2 |
| C3 | C1 | 2 |
| C1 | C2 | 2 |
| C2 | C4 | 2 |
| C4 | C7 | 2 |
| C7 | C8 | 2 |
| C8 | C5 | 1 |
| | Total | 18 |

As shown in Figures 7 and 11, each of the ten cups C1–C10 inclusive is attached to frame 102 by means of a pair of clips 134 secured to the outer face of each cup. When shaft S is rotated intermittently, the ten cups C1–C10 are moved in succession to pin receiving position adjacent the delivery ends of belts 50, as mentioned hereinabove. In Figure 7 it will be observed that the outer extremities of all of the cups C have been arranged to come up close to the pin discharge point of belts 50 and therefore there is little likelihood that pins delivered from belts 50 will not be deposited within each cup as it is presented for filling.

Spider 114, provided with the pin supports or supporting platforms P1–P4 and P6–P10 previously described, is yieldingly held by means of a spring 142 in pin supporting position by the engagement of stop 144 on distributor frame 102 with stop 146 on spider 114, see Figure 9. One end of spring 142 is secured to a stud 148 projecting from the bottom of distributor frame 102; its other end is attached to a stud 150 on spider 114, as shown in Figure 11. Spider 114 is also provided with a frame extension 152 on which is mounted a cam 154 adapted to maintain door 129 of cups C5 in pin supporting position (Fig. 11). When there is relative movement between spider 114 and frame 102, cam 154 is moved out of engagement with follower 132, and door 129 can move downwardly and thereby permit the discharge of a pin from cup C5 into its respective pin spotting device. Cam 154, mentioned hereinabove, is fixed to the top of frame portion 152 in position to co-operate with a cam roller 132 mounted on an arm 131 on door 129—see Figure 11.

As seen in plan view in Figure 7, the counterclockwise motion of distributor frame 102 and its cups C1–C10 inclusive relative to spider 114 and its pin supporting platforms P1–P4 and P6–P10, causes a movement of cups C1–C10 away from the pin supporting platforms, such that the pins are no longer supported by any of the platforms; also roller 132 rolls along and off the face of cam 154, which allows door 129 to drop down and pin No. 5 to be discharged from cup C5. In this manner, all ten pins are discharged substantially simultaneously from their respective distributor cups C1–C10 into the pin spotting table T.

A detailed step by step description of the operation of distributor D in receiving ten pins and at the proper time in its operative cycle, effecting the discharge of these pins to table T is as follows:

The first pin to be delivered from belts 50 strikes against actuator 55 and causes actuation of switch SW11 as the pin falls into cup C5. The actuation of switch SW11 causes distributor frame 102 to be moved in a counterclockwise direction, as shown by the arrow XX, Figures 2 and 7, so that when the indexing movement ceases, cup C9 is aligned with delivery belts 50 awaiting delivery thereinto of the next pin conveyed by belts 50. If desired, a suitable electrical or mechanical delay may be associated with switch SW11 in order to provide additional time for each pin to settle in each cup. As this pin is discharged from belts 50, thereby striking actuator 55 and actuating switch SW11 as it falls into cup C9, it sets into operation the indexing mechanism which causes distributor frame 102 again to be indexed in such manner as to locate cup C10 at the pin receiving position adjacent the discharge end of belts 50 awaiting delivery of the next pin of the set thereinto. The third and all successive pins to and including the tenth pin, cause the operation of the indexing mechanism to occur successively for loading cups C6, C3, C1, C2, C4, C7 and C8 which receives the last of the set of ten pins to be delivered by delivery belts 50 to distributor D.

The foregoing arrangement includes a yielding hold between the distributor and spider 114 for limiting counter-clockwise motion of the spider relative to the distributor at the desired time in the cycle of operation. However, except when relative motion between the distributor D and the spider 114 is required, it is desirable to provide latch means for locking these two elements together during the step by step motion of both during delivery of pins into the distributor. Otherwise, due to inertia, the spider 114 might have a tendency to lag each time the intermittent motion of the parts is initiated, resulting in a premature discharge of pins from the distributor cups C.

Such latch means are illustrated in Figures 11, 13 and 13A, and comprise the following mechanism:

Depending from the outer side of cup C5, beyond door 129 and roller 132, is a latch plate 167 having a notch 167a therein. Pivoted on cam plate 154 is a latch 168 having on its outer end a roller 168a. At such times as the distributor D and the spider 114 are required to move in unison, the inner end of latch 168 is releasably retained in the notch 167a of plate 167 by a spring 168b pulling on the latch, Figure 11. This arrangement is effective during the first nine indexing or step by step motions of the distributor and spider. Near the completion of the ninth movement just mentioned, suitable latch release means disconnect the latch 168 from the latch plate 167. Such means comprise a cam 169 suitably fixed on an extension 169a of the frame, see Figure 13A, and disposed in the path of latch roller 168a in a position to be engaged thereby to swing latch 168 about its pivot against action of spring 168b and lower its inner end out of the notch 167a.

Thus as the tenth step movement of the distributor and the spider occurs, and all the cups C are filled, stop 156, which is adjacent pin platform P7 will have moved into abutting relation to roller 158.

Further counter-clockwise movement of the spider 114 with the distributor D is then stopped. Roller 158, see Figure 10, is supported on the end of a crank arm 160 pivotally attached to a bracket 162 mounted on a support 164 fixed to the main frame of the machine, see Figures 2 and 7. From the foregoing, it will be seen that the action of spider 114 in relocating pin supporting platforms P1–P4 and P6–P10 in position beneath the cups C1–C4 and C6–C10 moves roller 168a out of engagement with fixed cam 169. The spring actuated latch 168 is thus free to swing about its pivot on plate 154 and engage the latch in notch 167a of latch plate 167, thereby effecting again the mechanical lock between the spider 114 and the distributor D.

At the proper time in the operating cycle of the machine, an external control circuit operating in a manner similar to that of the circuit including switch SW11, causes distributor frame 102 to be indexed in a counter-clockwise direction to the position shown in Figure 2 where cup C5 is located in pin receiving position relative to the point of delivery of successive pins from belts 50. In this indexing operation, spider 114 is held against movement along with distributor frame 102 because of the engagement of stop 156 with roller 158. Therefore the counter-clockwise movement of distributor frame 102 results in the movement of platforms P1–P4 and P6–P10 out of pin supporting relationship relative to pins in cups C1–C4 and C6–C10 and the dropping of trap door 129 so that there is a substantially simultaneous discharge of ten pins in the distributor cups into their respective pin supporting devices of funnels F in table T.

The bottom of cup C5 is so formed that the trap door 129 of cup C5 when turned in a clockwise direction, or the direction indicated by the arrow in Fig. 11, delivers a pin supported by trap door 129 into its proper funnel F on table T, or the funnel F located centrally on a line connecting the centers of cups C4 and C6, as viewed in Fig. 7. It is also pointed out that it is desirable that cup C5 be ready to receive the first pin of the next set of pins delivered to distributor D immediately after the discharge to the table of its previously held pin. It is therefore desirable to have trap door 129 close as quickly as possible after discharge of a pin from cup C5 in order to properly arrest and hold the first pin of the next set of pins to be delivered to distributor D. This is effected as follows: As distributor D is moved to its next dwell position beyond the position in which spider 114 is restrained from movement with distributor frame 102 because of the engagement of stop 156 with roller 158, the discharge of ten pins held in the cups C1–C10 takes place. A solenoid S3, Figures 7 and 10, mounted on bracket 164 and having its armature operatively attached to crank arm 160, is energized immediately after the discharge of pins to table T. This causes arm 160 to swing about its pivot thereby lifting roller 158 clear of stop 156. When this occurs, spring 142 described hereinabove, pulls spider 114 in a counterclockwise direction thus relocating pin supporting platforms P1–P4 and P6–P10 in their centered positions beneath cups C1–C4 and C6–C10. This movement of spider 114 also causes roller 132 to again engage the face of cam 154 and quickly and positively close trap door 129 of cup C5, thereby readying cup C5 for the reception of the first pin of the next set of pins to be delivered to the cups C of distributor D.

*Distributor timing means*

As shown in Figures 2, 3 and 4, the upper end of shaft S, which supports distributor D and spider 114, has secured thereto a horizontal cam plate 230, of which hub 232 is keyed to the shaft and held from endwise movement by set screw 234. Associated with the cam plate 230 is a group of three switches DA, DB, and DC, each of which is mounted stationarily upon the top of box B by suitable brackets constructed to position the cams at elevations such that selected parts of the cam plate can actuate desired switches during the rotation of the distributor D and cam plate 230 with shaft S.

Extending radially outward from and in the plane of the cam plate 230 are a series of eight cam lobes 236–250. Switch DA is so arranged that the roller on the actuator 252 for switch DA is disposed so as to be engaged successively by the same lobes 236–250 in a cycle of operation of distributor D.

It can be seen from the explanation of the indexing sequence of distributor D that in indexing from cup C5 to cup C9, only one revolution of clutch 184 is required. Actuation of switch actuator 55 by the first pin to arrive at the distributor, causes clutch 184 to make one revolution, as previously described, thus aligning cup C9 with the end of delivery belts 50. Indexing from cup C9 to cup C10 requires two revolutions of shaft 186 by clutch 184. The second pin arriving at the distributor likewise operates switch actuator 55, causing clutch 184 to start shaft 186 on another turn.

Just before shaft 186 has completed its first revolution, cam lobe 236 engages switch actuator 252, causing reenergization of clutch 184 to effect a start of the second revolution of shaft 186. Before this revolution is completed, and as cam plate 230 rotates, cam lobe 236 passes by switch actuator 252, which de-energizes clutch 184 and stops rotation of shaft 186 at the end of its second revolution.

Simultaneously cup C10 is aligned with the loading station and the indexing just described between cups C9 and C10 is successively repeated by the operation of switch actuator 55 by the passage thereby of successive bowling pins and the corresponding repeat actuations of switch DA through engagement of its actuator 252 by cam lobes 238–250. The foregoing action also successively aligns with the loading station cups C6, C3, C1, C2, C4, C7 and C8.

Switches DB and DC are disposed above cam plate 230 and aligned respectively with cams 254 and 256 which project upwardly from cam plate 230, as shown in Figure 4. These cams are located radially at different distances from the center of shaft S so that switch DB is engaged only by cam 254 and switch DC is engaged only by cam 256 in the course of rotation of cam plate 230. When distributor D has arrived in the position in which cup C8 is in alignment with belts 50, cam 254 has engaged and actuated switch DB.

In the described arrangement, the control circuit is such that when the tenth bowling pin operates switch actuator 55 in its passage into cup C8, clutch 184 is not engaged and the circuit to the back end motor M3 is interrupted, thus shutting down the entire back end drive. This action prevents premature delivery of a pin to distributor D since it is held stationary on belts 50 which are now at rest. A switch in the ball detecting circuit acts in conjunction with switch DC to start the motion of the table T at the proper time in the machine cycle.

With the distributor in the position described, in which cup C8 is in pin receiving position, cam 256 has approached but has not engaged and actuated switch DC. The next indexing movement of distributor D, which again positions cup C5 at the loading station, will effect discharge of the ten pins simultaneously from the distributor cups into the funnels F on the table T.

At this time, table T is in its uppermost position wherein the tops of its funnels F are adjacent the lower ends of the distributor cups C1–C10. By this arrangement, the pins in their passage from the distributor into the table, travel through a tortuous path, but during this time, this path is enclosed by the walls of the cups and the funnels, thus making it impossible for the pins to deviate from their intended destinations. In this way, pins are prevented from going astray and causing an obstruction which might block proper operation of the machine with possible destruction of parts.

The above described relative position of distributor D and table T during passage of pins from one to the other, reduces to a minimum the fall of the pins and also cuts down the total impact of pins on table T, whereby destructive wear is considerably reduced. By means of the pin handling means referred to hereinabove, the energy of each dropping pin is dissipated during its fall to an appreciable degree, preventing its sudden complete dissipation as the pin strikes the table at the bottom of its travel.

It is desirable to delay the downward motion of the loaded table until it is certain that sufficient time has elapsed to assure the proper delivery therein of a set of ten pins from the distributor. A switch in the ball detecting circuit is therefore used to cause distributor D to index to the position where cup No. 5 aligns with the loading station at belts 50 before the ten loaded pins are released to the table.

From the previous discussion of the indexing of distributor D, it is evident that while distributor D is making its final index or dumping step, spider 114 is restrained from moving with the distributor by engagement of roller 158 with fixed stop 156. By the time the distributor has nearly completed this last indexing step, all pin platforms P1–P4 and P6–P10 have been shifted from beneath the cups C1–C10 and thus the ten pins will fall from the distributor into the funnels F.

When switch DC has been energized, as previously described, relay TR5, see Figure 24, also closes contacts TR5b, which sets up a circuit to relay PR3, consisting of switch SW11 and TR5b contacts. Subsequent closing of switch SW11 by the first pin of another set of ten pins causes the spider release solenoid S3, see Figure 10, to operate. This action causes roller 158 to be disengaged from stop 156, allowing spider 114 to shift back to its position in which platforms P1–P4 and P6–P10 are under the respective cups. At the same time, door 129 of cup C5 is likewise returned to pin retaining position through re-engagement of roller 132 with the cam plate 154. These operations are assisted by the action of spring 142. Distributor D has now completed a cycle in which a set of ten pins has been received therein and distributed thereby to the table. It is again in position to receive and handle another set of pins in a similar manner.

*Pin spotting and respotting mechanism*

Referring to Figure 1, it will be seen that the pin supporting devices F, into which pins are delivered from distributor D, are mounted on and form a part of pin spotting and respotting table T located beneath distributor D. Table T is mounted for movement upwardly and downwardly between a pin receiving position beneath distributor D, and pin spotting, and respotting positions relative to alley A. Table T is supported by the opposite side frame members 103 of the machine which are attached to kickbacks K. Table T hangs from a main cross shaft 314 journaled in suitable bearings 316 secured to the top of side frame 103.

The mechanism for supporting and moving table T to and from the pin supporting portion or bed of alley A, is clearly shown in Figures 1, 2, 19 and 20. Suitably mounted on the left hand side of frame member 103, as viewed in Figure 2 is a motor M2 which is operated at the proper time during the operation of the machine by controls described hereinafter which effect the up and down motion of table T in order to spot and respot pins on alley A. The shaft of motor M2 is connected, as by means of a flexible coupling 318, to a suitable gear reduction unit 320 provided with an output shaft 322 on which is keyed sprocket 324. A chain 326 engaging sprocket 324 also engages a larger sprocket 328 keyed to main cross shaft 314 on the opposite ends of which are secured aligned crank arms 330. In this manner and by means of suitable speed reducing ratios, the desired number of revolutions per minute of shaft 314 is obtained during the periods when motor M2 is energized.

As shown in Figure 14, for example, table T preferably is in the form of a generally triangular framework which supports the spotting and respotting devices, and operating mechanisms therefor. Attached to opposite rear corners of table T are upwardly extending members 332 forming a support for a vertical guide plate 334. Plates 334 engage vertically spaced sets of guide rollers 336 mounted in stationary brackets 338 secured to side frames 103, whereby table T is guided in a substantially vertical path at all times during its upward and downward movement relative to alley A.

A transverse shaft 340 is mounted in suitable bearings formed in bearing brackets 342 mounted on side members 430 of the frame structure of table T. At its extremities, shaft 340 supports crank arms 344 mounted for free rotation thereon. Connecting rods or links designated generally 346 connect the free ends of crank arms 330 and 344. As shown in Figures 1, 19 and 20, each link consists of an intermediate rod section 352, an adjustable threaded sleeve 350a, a connecting member 351, and a shock absorber 354. Sleeve 350a, through which a reduced portion of rod section 352 projects, is threadably connected to a bushing 353 threadably secured to shock absorber housing 357. Member 351 is pivotally connected to crank arm 344, and also threadably secured to a threaded plug 355 secured in the lower end of housing 357 of shock absorber 354. Enclosed within housing 357 and encircling the reduced portion of rod section 352, are alternating laminations or washers 356, such as steel or other suitable metal or material, and resilient elements 358, preferably rubber, or other suitable material, which are compressed as a unit by a collar 360 attached to the end of the reduced portion of section 352 in order to cushion shocks and loads imposed upon crank arms 330 and 344, and for the purpose of imparting a smoother upward motion to the table during its movements to and from the pin supporting bed of a bowling alley. The upper end of each rod 352 is threaded into a suitable fitting 350b pivotally attached to a crank arm 330.

The foregoing structure is such that when an excessive load is placed on the table raising and lowering mechanism, as when upward movement of table T is initiated, collar 360 compresses the unit comprising washers 356 and resilient elements 358 to a greater extent than under normal operating conditions, and thereby momentarily lengthens rod 346; so also when table T is lowered after the first ball of a frame is rolled.

The upward and downward movement of table T relative to alley A is effected by the movement of crank arms 330 and connecting rods 346. As crank arms 330 travel in a clockwise direction, as viewed in Figure 1, and the pivotal connections between arms 330 and rods 346 move past dead center, crank arms 344 move in a counter-clockwise direction. In this manner, table T, which is guided vertically by tracks 334 and rollers 336, is given a substantially straight-line movement to and from alley A.

In order to reduce the power required for moving table T upwardly relative to the pin supporting bed of alley A, table T is counterbalanced by weights or a single weight W. As shown in Figures 1 and 12, the counterweight is located at the front of the machine, although if desired, it could be located at any other suitable place. Weight W is mounted on the ends of spaced chains 364 which extend upwardly from the weight over spaced sprockets 366 secured to opposite ends of a shaft 368 journaled in suitable bearings in forwardly and upwardly inclined spaced brackets 370 mounted on the frame structure of the machine. Chains 364 pass thence rearwardly over sprockets 372 loosely mounted at the opposite ends of shaft 314 and extend downwardly to suitable attaching elements which secure chains 364 to opposite sides of table T at 374. The weight of the table preferably is slightly in excess of counterweight W, so that table T always attempts to move downwardly against the action of weight W.

The normal at rest position of table T is designated position 400, see Figure 1. In a typical bowling cycle where two balls are employed for each frame, after the first ball has been rolled, table T moves from position 400 upwardly to position 402, thence downwardly to position 404 which is termed the respotting position, where standing pins are detected and gripped for lifting and respotting in on or off-spot positions as required by the individual pin positions. Table T then moves upwardly carrying any gripped pins to be respotted to position 400 while a suitable sweep (not shown) operates, removes fallen pins from the alley and deposits them in the alley pit before table T, moving continuously, moves to respotting position 404, where pins previously picked up, are deposited in their respective previous on or off-spot positions on the alley and released by grippers 454. Table T then moves upwardly to position 400 where it remains at rest while the second ball of the same frame is rolled. The second ball having been rolled, the operation of the machine is started and table T moves upwardly to position 402, thence downwardly to position 404 where the presence or absence of any pins remaining standing is detected. However, in this case, any standing pins are not picked up. The table then moves upwardly while the sweep again traverses the pin supporting bed of the alley and removes therefrom all fallen and standing pins. Table T moving to position 402, receives a set of pins carried by distributor cups C1–C10 in the manner described hereinabove so that when table T descends to its lowest or spotting position 406, see Figure 1, a new set of pins, carried by the table in funnels F, is released and deposited in proper on-spot triangular arrangement on the bed of the alley awaiting rolling of the next ball. Table T continues to move until it arrives at position 400 where it comes to rest.

A guard (not shown) may be provided to prevent damage to the table or parts thereof by an inadvertently of carelessly rolled ball during spotting and respotting operations, and also during the operation of the sweep. The guard is raised above the alley to inoperative position relative to alley A whenever the alley is ready for bowling.

If all pins are knocked down or a strike occurs when the first ball of a frame is rolled, table T moves as before, first up to position 402 and then down to pin detecting and respotting position 404 and returns as hereinbefore explained. The sweep passes rearwardly over the pin supporting bed of the alley, removing therefrom all fallen pins, and returns to inoperative position. Table T continues to move upwardly and at pin receiving position 402 a new set of pins in distributor D is discharged into the pin spotting devices or funnels F, after which table T moves all the way down to pin spotting position 406 and spots a new set of pins on the alley. Intelligence for accomplishing this is received by the electrical control system owing to the fact that the table has not detected the presence of any standing pins at position 404.

It will be seen that some of the intervening movements of the table, previously described, which occur in the absence of a strike on the first ball, and some of the movements in the second cycle of operations of table T are eliminated following a strike play.

Counterweight chains 364 will obviously have the same reciprocating travel as that of table T in a vertical direction. Chains 364 in passing over sprockets 366 cause the rotation of shaft 368 which is directly synchronized with the vertical movement of table T. For the purpose of indicating the presence or absence of pins after each ball is rolled, for gripping any standing pins for lifting and respotting after the first ball of a frame is rolled and for respotting such pins in their respective on or off-spot positions, it is necessary that the table be maintained in position 404 for a period sufficient to carry out these desired operations. A preferred mechanism for accomplishing this result consists of a latch 380 attached to one of the sprockets 366, as shown in Figure 12. As indicated, latch 380 is so positioned, that when table T is located at detecting-respotting position 404, it engages with a plunger 382 of a shock absorber 384 pivotally attached at its lower extremity to bracket 386 mounted on the forward portion of main frame 103. The armature 394 of a solenoid S5, which is mounted on bracket 392, is connected to one end of the link 396, the other end of which link is pivotally attached at 398 to shock absorber body 384. Energizing of solenoid S5 causes shock absorber body 384 to be swung on its pivot 420 to approximately the position shown in dotted lines 422. This moves plunger 382 out of engagement with latch 380 and permits further downward movement of table T from position 404.

*Spotter and respotter table*

The frame of table T consists of an upper frame and a lower frame interconnected therewith to form a single unit. The upper frame assembly is essentially triangular in shape and is formed of channel section side members 430 connected at their front ends as viewed at the bottom of Figure 14, by a transverse member 432. At their rear ends, channel section side members 430, see Figure 14, are connected by a transverse member 434, which, in the illustrated embodiment, is a rectangular tubular section.

The lower frame assembly consists of longitudinally spaced transverse channel sections 436, 438, 440, 442 and 444, connected by laterally spaced longitudinal channels 446 to form an assembly which makes up a series of ten substantially recangular cells R, see Figure 16. Each cell R has its central vertical axis disposed in substantially vertical alignment with the axis of one of a set of ten pins P supported in spotter funnels F, the latter being arranged in a pattern corresponding to the playing positions the pins occupy on the alley.

The pin spotting or upper portion of the table includes ten triangularly arranged pin spotting device designated generally 451. Each of these devices includes a pin receiving and holding member such as a funnel F located at the top of table T and projecting upwardly therefrom, Figures 1, 14, 17 and 18, into which pins are delivered at the proper time from distributor cups C1–C10, and within which they are supported in substantially centered rest position upon movable supports, such as trap doors 452. A pair or set of trap doors 452 is mounted above each of the respotting cells R directly beneath the lower portion of each funnel F as indicated in Figure 18. At the proper time in the cycle of operations of the machine, each of the ten sets of doors 452 is opened simultaneously and moved downwardly away from the pin which has been supported in each spotting device 451 so that all pins contained in the several spotting devices 451 are released substantially simultaneously and delivered to their desired spotted positions on the alley. Each set of doors 452 in addition to performing the function of supporting pins in spotting devices 451 for placement on the alley, is also designed to guide each pin into proper spotted position on the alley.

Mounted in the lower portion of table T within each cell R is a pair of opposed gripping bars or devices 454, Figures 16 and 18, which bars or devices are located beneath and in symmetrical arrangement with respect to each set of doors 452. Bars 454 may be formed of wood, metal or plastic or combinations thereof. Gripping bars or devices 454 are movable toward and from each other for gripping and holding pins to be lifted from the alley during the removal of deadwood and unwanted pins and for respotting and releasing the pins held thereby in the respotted on or off-spot positions each pin occupied ready for the rolling of the next ball of the same frame. Each gripping bar or device 454 preferably is provided with a covering, generally a resilient material, such as rubber, which insures a firm grip and also tends to prevent damage to the neck portions of pins being gripped, lifted and respotted.

Referring to Figures 14, 17, and 18, each of the funnels F disclosed is formed with an inverted generally truncated conical or flaring shape with a relatively larger open top portion 456, and a tubular lower portion 460 which can be formed integrally therewith or attached thereto. Lower portion 460 preferably is cylindrical and therefore has a circular discharge bottom opening 458. The diameter of portion 460 preferably is only slightly greater than the maximum diameter of a bowling pin. The top portions 456 of funnels F are flared laterally and are so positioned on table T with respect to distributor D that they register with the discharge openings of cups C1–C10 thereon. The bottom openings 458 of funnels F, which are all positioned concentrically with the centers of the pin spots on a bowling alley, are disposed in a plane a short distance above the plane of the top faces of longitudinal members 446.

As shown in Figures 17 and 18, the opposite sides of each member 460 are secured to the upper ends of oppositely directed supporting brackets 462. The lower ends 464 of brackets 462 are attached to the stationary parts 465 of hinges 467, which in turn are secured, as by bolts 470, to the top faces of frame members 446. Stiffening members 473 and 476 are attached to brackets 472 secured to cylindrical portions 460 of funnels F.

Referring to Figures 15, 17 and 18, each of the doors 452 consists essentially of a rectangular support, attached to or formed integrally with a hinge member 468 pivotally mounted on hinge pin 469. Doors 452 perform the dual function of supporting and guiding pins to be spotted, and also holding pins to be lifted and respotted in their respective on or off-spot positions so that such pins can be gripped properly for lifting and respotting. For this reason, the underside of each door preferably is provided with an undersurface which, when table T is lowered to respotting position, engages the head ends of any standing pins and holds them firmly against lateral movement on the alley. A resilient material, such as sponge rubber pad 453, has been found to be satisfactory for this purpose, see Figures 16, 18 and 23.

The upper surface of each door 452 is provided with a pin guide 455. The guide can be formed integrally with door 452, or as illustrated, can be attached to the upper surface thereof. Twenty guides are provided, one for each door, or two opposed guides for each set of doors 452. Since these guides are identical, only one is described in detail.

Each guide 455 is provided with an interior curved section 457 having an upwardly curved portion which generally conforms with the curve or taper of the butt end portion of a pin. Its shape is such that when doors 452 are closed and a pin to be spotted is resting thereon, the butt end of the pin is centered by the two opposed guides 455 relative to the spotted position it will occupy on the alley. When doors 452 are opened, the butt end of the pin is guided continuously by opposed curved portions 457 of guides 455 as the pin passes downwardly therebetween onto the alley. The same operation occurs in each of the ten spotter units 451. Each guide is adjustably mounted on its respective supporting door 452. In this manner, guides 455 of each unit 451 can be adjusted to and from or laterally relative to each other and secured by screws 459 passing through enlarged holes 461 in guides 455, Figure 15, in proper operative pin supporting and guiding relationship for exact spotting on the alley.

Each door 452 is actuated by a link 474, having a suitable end fitting 475, pivotally connected to an upstanding flange 477 on hinge portion 468. For each pair of doors, two of the links 474 have their upper ends attached to a pivot block 478 for synchronizing the action of the two doors with respect to each other. Each block 478 is mounted on a pivot pin 479 supported in the free ends of two spaced crank arms 480 which are attached to a rocker shaft 482. As seen in the drawings, the cell R, which corresponds to the position of pin #1, may be considered typical of the ten cells R of table T. The movement of doors 452 is effected by rotation of one of the shafts 482. Referring to Figure 14, rear shaft 482 operates four sets of doors 452 by virtue of having four sets of crank arms 480 attached to it. To the right hand extremity of each of shafts 482 is fixed a crank arm 484. Since it is desirable to operate all of doors 452 simultaneously and the same degree, all of the rock shafts 482 are similarly interconnected so as to be rotated to the same extent.

The first and fourth shafts 482, as viewed from the bottom of Figure 14, are each provided with a single crank arm 484. These arms are of the same length and are fixed to the shafts to extend in the same angular relation thereto. The two crank arms 484 on the driven rock shaft 482 (the third shaft as viewed from the bottom of Figure 14) are operatively connected respectively to the ends of the crank arms 484 on the two adjacent shafts 482 by links 486. In turn, the second shaft from the bottom of Figure 14 is operatively connected to the front shaft 482 by a link 486 pivotally attached to crank arms 484 on those shafts. Thus, upon oscillation of the driven rock shaft 482 to a predetermined extent, all of the other shafts 482 will be turned to a similar extent and in the same direction to thereby rock the crank arms 480 on the shafts and simultaneously open all pairs of doors 452 through their respective blocks 478 and links 474. Shafts 482 are journalled at their opposite ends in bearing brackets 490 attached to the top faces of the side frame members 430.

In Figures 14, 15, 17 and 18, the mechanism, including rock shafts 482 and links 486 and associated parts, is shown in a position in which the doors 452 are in closed position. That is to say, the mechanism thus far described constitutes synchronizing means for effecting like action on the doors in accordance with the actuation in the proper direction of the driven rock shaft 482.

When the mechanism for operating shafts 482 is actuated, the driven rock shaft 482 is turned in a direction which results in releasing or freeing, under mechanical control, the other rock shafts 482 so that they may be rotated in a direction to effect opening of the doors 452, under positive spring action. In the drawings, Figures 14 and 15, there are shown such spring devices arranged on one end of the first and second of the shafts 482. It should be understood, however, that each of the four shafts 482 can also be provided with one of such devices on an end thereof. These devices are constructed and arranged to operate as follows:

A spring 492 of conventional torsion type has one end fixed to a bearing member 490 in which an end of shaft 482 is journalled. The opposite end of spring 492 is attached to sleeve 494 loose on shaft 482. A smaller locking or clutch spring 496 also surrounding shaft 482 and having a close tolerance fit thereto has one of its ends attached to sleeve 494. By this combination of driving spring 492, attaching sleeve 494 and locking spring 496, it is possible to easily wind up spring 492 to any desired torque value, and the spring clutch locking action of spring 496 will then positively transmit that torque into shaft 482 to transmit motion for opening doors 452.

It is desirable to regulate or control the closed position of the pairs of doors 452 in order to insure that the bottom faces of the pin head engaging surfaces 453 all lie in substantially the same horizontal plane to insure substantially uniform contact with the heads of standing pins. This result may be obtained by means of a series of lugs or members 500 attached to the transverse members 438—444 in position to extend inwardly a short distance over the edge of each cell. The bottom faces of members 500 lie in the same plane. Each member 500 projects inwardly centrally of a cell so that portions of doors 452 of each pair, when moved to closed position, will abut against and be arrested in proper position by said extensions against further upward movement.

The main actuating rock shaft 482 in the illustrated embodiment is the third from the bottom, as viewed in Figure 14. Attached to one end of this shaft, which actuates the three other shafts 482, is a crank arm 502, see Figure 20. The free end of arm 502 is connected to one end of an adjustable link 504, the other end of which link is connected by a pivot pin 510 to one end of a link 506. The other end of link 506 is pivotally attached to bracket 509 mounted on the frame of table T, as shown in Figure 20, thus forming the elements of a typical four-bar linkage. A cam roller 512 mounted on pivot pin 510 engages the cam faces of cams shown in Figure 21, to be dscribed more fully hereinafter. The spring loading of driven shaft 482, as previously described, tends to move the four-bar linkage in the general direction of arrow T shown in Figure 20.

Referring now to Figure 21, when table T is in its full up position 402, roller 512 will be located at point 512A and yieldingly forced against cam face 514 by a suitable spring (not shown). As the table moves downwardly after the rolling of the first ball of a frame and when there are pins standing on the alley to be lifted and respotted, cam roller 512 rolls from cam face 514 onto an upright cam face 516 to position 512B. Cam face 516 is formed on a cam bar 517 pivoted at 518 on a plate 519 fixed to the machine frame. Table T in returning to its full up position, causes roller 512 to travel upwardly along cam face 516 and come to rest again at point 512A on cam face 514. In traversing this path, no horizontal motion is transmitted to cam roller 512, hence no motion is transmitted through the four-bar linkage to the pairs of doors 452, and they remain closed.

When a set of pins in spotter devices 451 is to be placed on the alley, table T moves downwardly and roller 512 moves from cam face 514, downwardly along cam face 516 past pivot point 518 continuing downwardly and to the left along a sloping cam face 520 on bar 517 and thence to vertical cam face 522 on that bar. As roller 512 moves below pivot 518, bar 517 swings clockwise on that pivot, as viewed in Figure 21, against the action of spring 526, until it bears against vertical cam face 524 on a fixed bar 525.

Thus cam roller 512 has moved in a horizontal direction a distance X (Figure 21), which motion is transmitted through the four-bar linkage previously described, thence through the door operating mechanism. Doors 452 are opened a predetermined amount consistent with the movement X of roller 512. In this position of roller 512, doors 452 are almost completely opened, but not enough to allow the pin to drop through the door opening. As roller 512 progresses downwardly to the end of cam face 522, it rolls off the lower end of bar 517 and abruptly engages against cam face 524 at position 512C. This last action of roller 512 in moving quickly from cam face 522 to cam face 524, positively and quickly opens doors 452 to their full extent and effects a quick release and deposit of a set of pins upon the alley. It is to be noted that each set of doors 452 opens sufficiently to clear a spotted pin entirely as table T moves upwardly.

Spring 526, as shown in Figure 21, urges pivoted cam bar 517 in the direction indicated by arrow H. As roller 512 passes downwardly along cam faces 520 and 522, spring pressure, derived from springs 492 and 496 on shafts 482, is sufficient to overcome the action of spring 526 and shift bar 517 as stated. Prior to upward movement of table T after a set of pins has been spotted, since cam roller 512 has moved out of contact with the lower end of cam bar 517, spring 526 returns the bar to its normal position, which is determined by the engagement of the upper end of bar 517 with a fixed inclined bar 527, the lower end of which aligns with the upper end of cam bar 525.

During the movement of table T upwardly after having deposited a set of pins on the alley, roller 512 rolls upwardly between bars 517 and 525 and along cam face 524 to position 512D. It can be seen that in this vertical travel of roller 512, no displacement of roller 512 in the horizontal direction takes place. With cam roller 512 at position 512D, the bottom edges of the now open doors 452 have ascended to a position above the tops and clear of the pins standing on the alley. As the table continues upward, roller 512 passes along inclined cam face 528 of bar 527 and in so doing, contacts the inner face of the upper arm of the pivoted bar 517 and moves that bar on its pivot clockwise, as viewed in Figure 21, to allow passage of roller 512 out between bars 517 and 527 and back to its original position at 512A, resting against outer cam face 514.

Movement of cam roller 512 from position 512D to 512A, causes roller 512 to be displaced horizontally a distance Y, as indicated, thus transmitting motion through the four-bar linkage and the previously described door-operating mechanism, rewinding springs 492 to effect closing of the doors 452 against their stops 500. In Figure 21, the positions 512A, 512B, and 512C represent the positions of the roller 512 corresponding to positions of the center of shaft 340 as represented at 402, 404, and 406 on Figure 1. The position of roller 512 when the center of shaft 340 is at a position as represented at 400, is directly below roller position 512A.

*Pin respotting mechanism*

Each of the ten cells R is provided with means, operative at the proper time in the bowling cycle, for gripping and holding pins to be lifted and replaced in their on and/or off-spot positions pending rolling of the next ball of the same frame. This gripping means includes the opposed pairs of substantially parallel arms or bars 454. Since each pair or set of bars 454 is identical in construction and operation, it is deemed sufficient to describe but one in detail.

The opposed pairs of gripper bars 454, as indicated in Fig. 17, extend longitudinally relative to a bowling alley, although if desired, they could extend transversely or at an angle to the longitudinal axis of the frame of table T. In their full open or inoperative positions, bars 454 are located adjacent opposite sides of cells R. One end of each gripper bar 454 is provided with a freely rotatable roller 530, Figs. 17 and 23, located beneath a guide bar 533 attached to a channel section, as for example, 436. Roller 530 runs on a flange 531 formed on a transverse horizontal track bar 532 attached to a transverse member of a cell R.

In the illustrated embodiment, see Figures 22 and 23, actuation of each set of gripper arms 454 is effected by a self-centering, five-bar linkage unit consisting of a pair of downwardly extending links 534, a pair of links 536 and a cross link 538. The common pivot 539 between links 536 is attached to a slide 540, slidably supported on and guided by a vertical track bar 542 attached to the upper flange of one of transverse beams 436—444 by means of a clip 543. The outer ends of links 536 are pivotally attached at 537 to the upper ends of links 534, which in turn are pivotally connected between their ends to link 538.

Tension springs 546 are attached to the lower end of track bar 542 and to clips 548 on the pendent links 534. It can be seen that an upward movement of slide 540 on track bar 542 causes a displacement of the five-bar linkage described, such that gripper bars 454 will be urged away from each other. This motion is confined to a horizontal plane and straight line motion relative to the sides of a cell R by virtue of the roller and track arrangements 530, 532 and 533. Similarly a downward motion of slide 540 on track bar 542 causes gripper bars 454 to move toward each other. When the gripper arms 454 are urged away from each other, they come to rest symmetrically at opposite sides of a cell R. When gripper arms 454 are urged towards each other, the structure described allows each pair of gripper bars 454 to assume any position between the sides of its cell R depending upon the on or off-spot position of a pin gripped by the opposed bars 454. Each standing on and off-spot pin to be gripped, lifted and respotted, as described hereinafter, is clamped by the under surfaces of table trap doors 452 against alley A. Thus, when a normal on-spot clamped pin is to be gripped by bars 454 for lifting and respotting, each bar 454 moves substantially the same distance from its inoperative position adjacent the side of a cell R into gripping engagement with a side of the neck of a pin. Gripping bars 454 are so located that when table T is positioned at position 404, bars 454 can engage and grip the necks of any standing pins to be lifted.

If a pin to be lifted and respotted occupies an off-spot position, as soon as the bar 454 nearest the pin engages it, the movement of the bar is arrested. When this occurs, the end of link 538 connected to the other link 534, which carries the bar 454 not yet engaging the pin, swings to the right and downwardly, as viewed in Figure 23, whereupon as slide 540 continues to move downwardly, this bar 454 continues its forward movement into gripping engagement with the opposite side of the neck of the pin until its motion is arrested and the pin is firmly gripped for lifting. As the slide 540 moves downwardly, and after the right hand gripper bar 454, as viewed in Figure 23, has engaged the right side of the neck of a pin, the upper end of the link 534, which supports the right hand gripper bar 454, swings to the right. At this time the gripper bar 454 acts as a pivot point for its supporting link 534, thereby permitting the link 536 connecting it to slide 540 to move downwardly along with slide 540. The same operation takes place simultaneously with each of the ten pairs of gripper bars 454. It will be seen, therefore, that because of its operating connections, each bar 454 is given an on-spot, off-spot range which allows each pair of bars to grip a pin anywhere within the general area of a cell R. The provision of elongated gripper bars or rollers 454 makes possible the positive gripping of on and off-spot pins over substantially the entire area occupied by bowling pins on the pin supporting deck of an alley, which is a greater area than heretofore available for this purpose. Parallelism of gripper bars 454 is maintained by the inherent torsional rigidity of pendent links 534 coupled with the resistance to bending and torsional stiffness of the rest of the five-bar linkage, and its associated parts and attachments, which make possible the individual and differential travel of each bar 454 of a pair of gripper bars 454 towards an on or off-spot pin.

*Table moving mechanism*

The vertical movement of table T is effected by the rotation of crank arms 330 and the action of connecting rods 346, which in turn impart vertical reciprocating motion to the table T through connecting crank arms 344. In the travel of the table from full up position 402 to full down position 406, and return, crank arms 344 at these positions remain substantially vertical, see Figure 1. When, however, table T is stopped at respotting position 404, crank arms 344 will be substantially in the position shown in dotted lines in Figure 19, and connecting rods 346 will be angularly displaced in approximately the manner shown in that figure.

Arms 344 are freely journalled upon shaft 340 but are restrained from moving in a clockwise direction by adjustable stops 550 mounted in suitable ribs 551 on brackets 342 and acting in conjunction with their respective stop pins 554 integrally attached to and projecting from arms 344, see Figure 19. Further clockwise motion of crank arm 330, through the action of connecting rod 346, will cause arm 344 to rotate in a counter-clockwise direction to a predetermined angle with respect to the table during the time the table is held at respot height or position 404.

A crank arm 556 is fixed to each end of shaft 340 and each carries an adjustable set screw 558. Each stop pin 554 is extended through an arm 344 to form at the opposite side thereof a drive pin 560. When crank arms 344 move in a counter-clockwise direction, each arm 344 rotates freely on shaft 340 until drive pins 560 thereon abut adjustable set screws 558. Further counterclockwise motion of crank arms 34 will now impart counter-clockwise rotary motion to shaft 340 through the desired angle, as previously mentioned. Shaft 340, see Figures 1 and 14, comprises the rear shaft of a set of four shafts, the other three being designated 562, 564, and 566, respectively. These shafts are so arranged that when shaft 340 is rotated, shafts 562, 564 and 566 also rotate in the same direction and to an equal extent. The operation of these shafts is used to actuate the gripper mechanisms simultaneously in all of the cells R. For example, shaft 340 when rotated, effects the simultaneous operation of the pairs of opposed gripper arms 454 in the four transversely arranged cells R at the rear of the table, see Figure 14; shaft 562 effects like operation of the grippers 454 in the three cells forward of the four just mentioned; shaft 564 operates the grippers 454 in the next two forward cells and shaft 566 effects a similar actuation of gripper 454 in the one cell at the front.

The four shafts preferably are interconnected for simultaneous rotation by means generally of the same sort as shown and described for the purpose of operating the door mechanism. For example, shaft 340 is provided with a crank 568 to which is pivoted one end of link 570 operatively connected at its other end to a similar crank 572 secured to shaft 562. This shaft has another crank 574 operatively connected by a link 576 to crank 578 on shaft 564. Shaft 564, in turn, has a crank 580 operatively connected to a crank 582 on shaft 566 by a link 584.

*Gripper operating mechanism*

Since the operation of the gripper mechanism in each cell R is identical, the description will be limited to the operation of the gripper bars 454 in cell R corresponding to No. 1 pin position, see Figures 17, 22 and 23.

A crank arm 590 is freely journalled on shaft 566 near its center. A collar 592 is secured to shaft 566 adjacent crank arm 590. A pin 593, Figure 22, fixed to collar 592 engages slot 594 in crank arm 590. A torque spring 596 surrounding shaft 566 has one end attached to crank arm 590 and its opposite end to an adjusting sleeve 598 encircling shaft 566. Also attached to sleeve 598 is one end of locking spring 600 which frictionally engages shaft 566 to positively position and lock spring 596 with respect to shaft 566. The spring force exerted by spring 596 is such as to urge the outer end of crank arm 590 in a downward direction with respect to shaft 566, but such movement is normally prevented by pin 593 engaging the end of slot 594 as indicated in Figure 17. The outer end of crank arm 590 is pivotally attached at 601 to one end of a connecting link 602. The other end of connecting link 602 is attached by a crosspin to pivot 539 between slide 540 and links 536. It can be seen that a counter-clockwise motion of crank arm 590 will, through connecting link 602, cause a downward movement of slide 540. Conversely, a clockwise motion of crank arm 590 will cause an upward movement of slide 540. This counter-clockwise motion is necessary for the operation of the five-bar linkage which in turn actuates gripper arms 454 in the manner described.

As slide 540 is moved downwardly, gripper bars 454 engage and grip the neck of a pin; and their further inward movement is arrested. However, pin 593 attached to collar 592 on shaft 566, may, however, continue its counter-clockwise motion within the space provided by slot 594. This allows, in a cell where no pin is present, continued counter-clockwise motion of crank arm 590, pin 593, and the accompanying shaft 566 as contrasted to an arrested or shorter stroke motion of crank arm 590, as just described.

A tab 604, Figures 15 and 17, carrying an adjustable set screw 606 is fixed to each crank arm 590. A switch bracket 608, Figure 17, supports a switch SW1 and actuator 609 in the path of travel of set screw 606. In the event that the gripper bars 454 come into engagement with a pin in their travel toward each other, they will be arrested short of contact with each other. In this case, the movement of tab 604 carrying set screw 606, and its supporting crank arm 590, is arrested prior to contact of screw 606 with the switch actuator 609. If, however, there is no standing pin to be gripped or engaged by a pair of gripper arms 454, the latter will continue to move towards and into engagement with each other, in which case the crank arm 590 will cause the set screw 606 to move a greater distance and it will then come into contact with and operate the switch actuator 609 for the corresponding switch SW1. A similar pin detecting device is provided for each pair of gripper arms 454. It can be seen that the absence or presence of pins in cells R is electrically detected for cyclic control of the machine.

As previously described, it is possible for a pin to be so far off its normal on-spot position that the head of the pin will be engaged by one of the lower flanges or some part of the lower section of the table frame structure. In such an event the table will be stopped at a safety position designated 408, see Figure 1.

The desired safety action may be effected by the engagement of a set screw 622 on arm 621 arranged alongside tab 604, Figure 15, which screw will engage a switch actuator 609 to close its associated switch SW13, Figure 17. Switch SW13 may be arranged in the power supply line, see Figure 24, to open the line and stop the machine. Switch SW13 and switch SW1 are two switches operated by separate actuators (see Fig. 15). The switch SW1 actuator is so located that it operates the switch when the grippers close beyond the point denoting a pin, when the table has descended to its full down position in the respot cycle. At this point, shaft 566 has not rotated sufficiently to actuate switch SW13. This position is as far as shaft 566 rotates when the table is at normal down height. If, however, a pin is beyond normal respot range, the table will stop at a higher position, i. e. 408, Fig. 1, due to the pin supporting the table by one of members 436, 438, 440, 442, 444 and 446 of Fig. 16; and shaft 566 will rotate farther than necessary for normal pin gripping action. Switch actuator set screw 622 on arm 621 is so adjusted that with this amount of rotation of shaft 566, a larger rotation than is required to actuate switch SW1, switch SW13 will be actuated. In a strike cycle, switch SW13 is not actuated. Since no pins are left standing, the table descends its full amount (no off-spot pins hold it up) and shaft 566 does not rotate sufficiently to actuate either switch SW1 or SW13. Switch SW1 is actuated, however, if switch SW13 is actuated, but switch SW13 is not necessarily actuated if switch SW1 is actuated inasmuch as a greater rotation of shaft 566 is required to actuate switch SW13 than is required to actuate switch SW1.

The switch SW13 actuator set screw supporting arm 621 is attached to collar 592 which rotates with the shaft, whereas the switch SW1 actuator is attached to crank 590 which is rotated by the force of spring 596 whenever the shaft rotates. The rotations of crank 590 and shaft 566 are not necessarily the same. Shaft 566 can rotate a larger number of degrees than can crank 590 which stops rotation when the gripper arms move into pin gripping position. In this way, the desired overtravel of crank 590 necessary to actuate switch SW1 or switch SW13 can be effected.

This higher than normal stopping position for the table causes crank arm 344 to be rotated in a counter-clockwise direction further than needed for operation of the pin gripping mechanism. The differential action just described between crank arm 590 and shaft 566 allows a sufficient degree of freedom to accommodate this excessive angular motion of crank arm 334 and associated torque shafts 340, 562, 564, and 566 without mechanical damage to the spotting table and its associated mechanism.

From the preceding description, it may be seen that the electrical indication will be that no pins have remained standing and the cycle and scoring of the machine will be modified accordingly. This modification seldom takes place because of the infrequency of such an extreme offspot pin. It is considered in the design to prevent damage to the machine.

The tendency of the gripper arms 454 to close through the mechanism described is opposed by the force of a pair of springs 612, Figures 1 and 16. Thus when the holding or driving force of connecting rod 346 is relaxed from crank arm 344, springs 612 will return bars 454 of the gripper mechanism to their full open or inoperative position. This, of course, releases any pins which are to be respotted on the alley. Springs 612 each have one end connected to crank arms 579 extending from shaft 564. The opposite ends of springs 612 are attached to spring clips 614 on the lower flange of transverse frame member 440.

Brackets 581 are secured to opposite sides of table frame 430. Adjustably mounted in brackets 581 are stop screws 583 adapted to be engaged by levers 579 on shaft 564. In this manner the opening movement of gripper bars 454 is restricted. This arrangement also prevents gripper bars 454 from striking against the end frames of their respective cells R if for any reason, table T should be released accidentally and drop suddenly to its lowermost position.

Attached to crank arm 568, see Figure 19, is a cam plate 615 which rotates with shaft 340. A latch 616 pivoted at 617 on bracket 342 has one end arranged to engage a tooth on cam 615 through the action of a spring 618. This spring extends about armature 619 of solenoid 620 to which one end of latch lever 616 is pivoted. In the latched position, shaft 340 will have been rotated to the proper position for the gripper mechanism to have fully closed. When it is desired to lift pins from the alley, this cam and latch lock the gripper mechanism in its closed position. When the pins are again lowered to the alley, solenoid 620 is energized, thus releasing latch 616 from engagement with cam 615 and allowing springs 612 to return the several gripper arms 454 to their full open position. Similarly when it is desired, in the cycle of the machine, to electrically indicate the presence or absence of pins in the various cells R, solenoid 620 is energized while this standing pin detection is carried out, again allowing the gripper mechanism to return to its open position through the action of springs 612.

*Operation of the electrical control*

All elements shown in the wiring diagram, Figure 24, are in "normal" position, i. e. when the machine is ready for play. A set of pins is standing on alley A awaiting rolling of the first ball of a frame.

*First ball cycle.*—In a normal first ball cycle, the ball, thrown by a bowler, arriving in the pit, closes cushion starting switch SW20 causing the energization of latching relays LR1 and LR7. These relays can be of conventional latching relay design. Switch SW20 can be mounted on the backstop or cushion (not shown) at the rear of the pit, and can be closed by the impact of a ball striking the cushion. If desired, however, switch SW20 can be located in the pit of an alley in a manner similar to that shown in Rundell Patent 2,388,707 above referred to. The closing of contacts LR7a in turn causes energization of relay L5 directly from the power line and the closing of the L5 contacts starts the ball lift motor M4 directly from the power line. Motor M4 actuates the ball lift mechanism (not shown) which lifts the ball out of the pit, and deposits it on the return ball runway (not shown) where the ball operates a switch SW14 which unlatches relay LR7 and causes ball lift motor M4 to stop.

The closing of contact LR1a causes energization of relay TR1 which is held in until LR1 is unlatched again. The closing of the contact TR1b causes energization of relay L4 from the power line through the cam SC contacts 650a. The closing of the L4 contacts effects the starting of the sweep motor M1 which lowers the sweep (not shown) to the alley. Sweep motor M, through an indirect drive (not shown), also causes shaft N on which are mounted cams SB, SC, and SD, to rotate. When the sweep reaches the alley, the high portion of cam SC moves out of engagement with follower 650 which opens contacts 650a and closes contacts 650b. This causes motor M1 and consequently the sweep, to stop.

The closing of contact TR1c completes a circuit to normally closed contact TR3b which pulls in relay L3, thereby closing this contact and connecting motor M3 with the source of power. This drives the back end pin elevating mechanism (not shown) which conveys pins in succession from the pit of the alley and delivers them one by one between conveyor belts 50. The latter convey pins in succession to cups C1–C10 of distributor D which is also driven indirectly from motor M3.

The closing of contact TR1c also causes energization of relay PR2 through the normally closed contacts TR3b, LR6a and TR5c. The energization of relay PR2 closes its contacts and causes the energization of distributor indexing solenoid S2 directly from the power line. In this manner distributor D is indexed, and a set of ten pins is delivered at the desired time to table T. Since cam plate 230 is mounted on distributor shaft S and cams 254 and 256 are mounted on cam plate 230, these cams index or rotate with distributor D. Just before the end of one complete indexing movement or rotation of distributor D and the delivery or discharge of all pins from cups C1–C10 of the distributor into pin spotting devices 451 of table T, cam 254 opens contact 652a and closes contact 652b of switch DB. Shortly thereafter cam 256 closes contact 654, thus effecting the energization of the relay TR5. The energization of relay TR5 closes contact TR5b which sets up a circuit to relay PR3, consisting of switch SW11 and TR5b, such that the subsequent closing of switch SW11 by the first pin of a set of ten pins causes the spider release solenoid S3 to operate releasing the spider from its open position with respect to the distributor, thus allowing the spider to act again as a support or platform for the pin delivered to the distributor.

The presently closed contacts TR3b, TR1c and TR5d, cause the energization of latching relay LR6, the closing contacts LR6b of which then permit power to flow to relay L3, thus energizing the latter and closing its contacts, thereby supplying power to back end motor M3, which keeps running continuously until the cups C1–C10 of distributor D again are filled with pins.

As each pin, conveyed from the pit to the ten cups C1–C10 of distributor D, is oriented and dropped with butt end first into its proper cup, it passes actuator 55 and momentarily operates a loading switch SW11, Figure 2, which, through the now closed cam actuated switch contacts 652b, causes intermittent energization of the index solenoid S2, each energization resulting in one indexing operation transmitted to the distributor. Since some of the pin carrying cups C of distributor D are spaced twice the distance apart from others, two successive energizations are provided through the shape and action of cam plate 230 when two impulses are required. After the ninth pin has reached and effected the indexing of distributor D, cams 236, 254 and 256 have reached the position occupied at the start and remain in this position until the starting of a new frame of bowling. When the tenth pin, delivered to the distributor, actuates loading switch SW11, the cam switch contacts 652b are open and no indexing takes place. However, since the contacts 652a are closed at this time, it causes the unlatching of the LR6 relay and effects the stopping of back end motor M3.

When relay TR5 is energized at the beginning of the first ball cycle, as described heretofore, the TR5a contacts are closed. This operation, through presently closed TR1a contacts, causes the energization of table relay L2, which in turn results in the closing of its contacts and the starting of table motor M2. The latter is employed for the purpose of operating table T, and also for driving shaft 656 to which are secured a number of electrical control cams which will be described hereinafter. Shaft 656 is driven by means of a sprocket 657 fixed thereto driven by chain 659 by driving sprocket 661 fixed to shaft 314. The ratio of the sprockets 657 and 661 is such that shaft 656 makes one revolution for every two revolutions of shaft 314.

As soon as table motor M2 is started, table T moves slightly upward to position 402 and immediately descends to position 404 where the head ends of any standing pins are engaged by clamping pads 453 during the movement of bars 454 into gripping engagement therewith. The rotation of shaft 656, upon which cam TA is mounted, causes cam TA to close its contacts and assures that relay L2 remains energized. During the downward movement of table T, cam TM, also mounted on shaft 656, closes its contacts and effects an unlatching of relay LR1 and an energization of cycle latch relay LR4. The unlatching of relay LR1 causes the opening of contacts LR1a, which break the circuit through the coil of relay TR1 and which is thereby de-energized.

Although the contacts actuated by cam TK, also mounted on shaft 656, in the meantime are closed by cam TK, the gripper mechanism of the table upon reaching the respotting position 404, is caused to lock and grip any pin which remains standing on the alley since the presently open TR3d contacts prevent the respot release solenoid S4 from being actuated. After the gripper mechanism of the table has gripped any standing on or off-spot pins, table T moves upwardly again, during which movement cam TC on shaft 656 closes its contacts and through the now closed contact 650b operated by cam SC, provides current to energize relay L4 and consequently starts sweep motor M1. In the meantime, the table has reached its uppermost position 402, and starts to descend again. This downward movement is stopped and the table is arrested as soon as cam TA contacts open again. During the forward movement of the sweep, cam SB contacts open, and while table T holds gripped pins lifted above alley A at position 400, the sweep sweeps all fallen pins into the pit and then returns to its previous starting position and contacts SB close. Upon reaching its previous starting position, cam SC reverses its contacts again which, due to now open TR1b contacts, effects a stopping of sweep motor M1.

When cam TA contacts open as described above, cam TB contacts close. If the cam SB contacts are open, when cam TA contacts open, table motor M2 will stop. If cam SB contacts are closed, table motor M2 will continue in operation through the action of cam TB contacts, and cam SB contacts, both of which are now closed. This operation causes table T to continue its downward motion. It is evident that, if for some reason the sweep is not out from under the table at the proper time, cam SB prevents the table from resuming it downward movement.

Upon the downward movement of table T, cam TL contacts close, but have no specific function at this time and cause no action since contacts TR3e are open. When the descending table T reaches its respot position 404, cam TJ contacts close and through the presently closed TR3c contacts, cause the energization of relay PR4, which in turn effects the energization of respot release solenoid S4, resulting in a release of the pins by the pin gripper bars 454 of table T. After the pins are released, the table ascends again, during which movement, cam TE contacts close but have no specific effect during this cycle and cause no action since contacts TR3f are open. During the upward movement of table T, cam TF contacts close also and cause the energization of cycle relay LR3 through the presently closed contacts LR4a. The energization of relay LR3 causes the closing of its contacts, which results in the energization of relay TR3.

Shortly before the table reaches its dwell or neutral position 400, cam TD contacts close and provide a circuit through the presently closed contacts LR1b, TR5e, LR7b and cam SD contacts to permit energization of relay L4, provided the ball upon returning to the player, has actuated switch SW14 which causes the unlatching of relay LR7 and effects the stopping of the ball lift motor M4. The energization of relay L4 causes the closing of its contacts and the starting of sweep motor M1, which results in the lifting of the sweep mechanism (not shown) above alley A. When the sweep reaches its uppermost position, cam SD contacts open and effect a stopping of sweep motor M1.

The first ball cycle is now completed and the machine is ready for the second ball of the same frame to be thrown by the player.

*Second ball cycle.*—The starting operation is substantially the same as in the first ball cycle, namely, the ball rolled by the player operates the starting switch SW20 which in turn causes the energization of relays LR1, LR7, and TR1. The ball lift motor M4 starts in the same fashion as in the first cycle, and sweep motor M1 brings the sweep mechanism down on the alley.

The back end motor M3, actuating the pin elevator and distributor D, begins to operate after the first ball is rolled, and continues to run until ten pins are delivered into the distributor. The distributor is not indexed because of the rolling of a second ball since contacts TR3b and LR3a are now open.

The starting of table motor M2 is effected through the presently closed contacts TR1a and TR3a. During the downward movement of table T, table motor relay L2 is held energized through the closing of cam TA contacts. Also, during the downward movement of table T, cam TM contacts close and unlatch relay LR1, resulting in the falling out of relay TR1.

When table T arrives at respot position 404, cam TK closes its contacts and effects energization of respot release solenoid S4, through now closed TR3d contacts, and energization of relay PR4, thus permitting the gripper mechanism of the table to close and reopen, and allowing any standing pins to remain on the alley. If no pins are standing, the closing action of the pin gripper mechanism causes the closing of all the pin indicator switches SW1 to SW10, which results in the energization of latching relay LR5, but since relay TR3 is already energized, this has no effect or special purpose in this cycle.

After the reopening of the gripper mechanism, the table ascends again and stops at its neutral or dwell position 400 above the alley. The sweeping mechanism, already located on the front portion of the alley, then commences its sweeping operation in the same manner as described in the first cycle, but this time sweeps all pins, standing or fallen, into the pit. As mentioned in the description of the first ball cycle, the table was supplied with a new set of pins, and has carried this set of pins in its upper portion from the beginning of the first ball cycle.

The table then descends again and cam TL closes its contacts which, through the presently closed TR3e contacts, causes energization of relay PR5 which in turn effects the energization of spot-respot relay S5. The energization of the latter permits the table to travel its full distance down to its spotting position 406, and a new set of pins is placed on the alley.

When table T ascends after spotting a set of pins on the alley, cam TE closes its contacts and the cycle latch relay LR4, which was energized during the first ball cycle, is unlatched through the presently closed TR3f contacts. Shortly thereafter, cam TF closes its contacts which, through the presently closed contacts LR4b, causes the unlatching of relays LR5 and LR3, resulting in the de-energization of relay TR3.

By the time the table has reached its dwell position 400 above the alley, cam TA opens its contacts, which effects the stopping of the table motor M2 and, consequently, arrests further movement of table T.

*Strike cycle.*—In case all pins are knocked down by the first ball of a frame when table T descends to test for pins, all sets of gripper bars 454 are able to close. This results in the closing of all pin indicator switches SW1 to SW10. At the same time, the cam TK closes its contacts which, through the presently closed SW1 to SW10 switches, provides current for the energization of latch relay LR5, resulting in the energization of relay TR3, which immediately directs the machine through a second ball cycle described above and a new set of pins is placed on the alley.

Since TR3 is energized when cam TE closes its contacts, latch relay LR4 is unlatched through contacts TR3f. Since relay LR4 is unlatched by this action, the closing of cam TF contacts subsequently causes the unlatching coil of LR3 to be energized. Cam TF also unlatches relay LR5. By these two actions, the TR3 relay coil is de-energized, which means the machine is reset to the first ball position.

*Off spot limit.*—During the course of bowling, it may happen rarely that a pin may be moved beyond the range of action of a pair of opposed gripper bars 454 or the relatively large off-spot limit provided by each of the cells R of table T. If this occurs in descending, table T is prevented from moving to its respotting position 404 due to the engagement of a frame member, such as 440 or 446, with the top of a standing pin. The crank motion drive, however, which is provided for raising and lowering table T and for operating gripper bars 454, continues its operation. Each pair of gripper arms therefore move a greater distance towards each other than they normally would travel in engaging and gripping on-spot or off-spot pins. This extended travel of gripper arms 454 results in the opening of an off-spot limit switch SW13, provided in the power supply line, thus stopping the entire machine.

Since the closing of the gripper arms also effected the closing of all SW1 to SW10 switches, the machine, after the removal of the off-limit pin, will immediately switch to a second ball cycle, if the off-limit pin resulted from the rolling of the first ball of the frame, by reason of power being supplied through the switches SW1–SW10 to relay LR5 which, when energized, effects the energization of relay TR3, and if the table advances far enough so that continued rotation of shaft 656 causes cam TK to close its contacts.

The invention above described may be varied in construction within the scope of the claims, for the particular device, selected to illustrate our invention, is but one of the many possible concrete embodiments of the same. It is not, therefore, to be restricted to the precise details of the structure shown and described.

What is claimed is:

1. In a bowling pin spotting machine for use with a bowling alley, a pin spotting and respotting table, means mounting said table for movement to and from said alley, triangularly arranged pin spotting funnels mounted on said table, a set of opposed movable pin supports mounted on said table beneath each of said funnels, said funnels being adapted to position pins delivered thereinto in substantially upright position on said sets of movable pin supports, mechanism for simultaneously moving each of said supports out of pin supporting position relative to a pin supported thereby for effecting the simultaneous discharge and deposit of said pins in playing arrangement on said alley, means on said movable supports adapted to clamp pins resiliently on said alley for lifting by said table, means on said table for holding said last-named pins during the upward and downward movement of said table, and means for actuating said last-named means to release said pins in respotted arrangement on said alley.

2. A bowling pin spotting machine for use with a bowling alley comprising a pin spotting and respotting table, means mounting said table for substantially vertical movement to and from said alley, triangularly arranged pin spotting units mounted on said table, each of said units including a set of opposed pin supporting trap doors and means for positioning said trap doors in substantially the same horizontal plane, guide means for locating a bowling pin in each of said pinspotting units in upright position, with the base of each pin supported by said trap doors, individually operated pin gripping and holding devices mounted on said table beneath each of said sets of trap doors, mechanism for lowering said table relative to said alley including means for locating said table in pin discharging position adjacent said alley, and for locating said table in pin gripping position relative to standing pins to be gripped, lifted and respotted on said alley with the under faces of said trap doors clamping said standing pins on said alley, and selectively operative mechanism for simultaneously moving each set of trap doors to pin releasing and depositing position, or for operating said devices to grip and hold each standing on or off-spot pin clamped by said trap doors upon said alley.

3. A bowling pin spotting machine for use with a bowling alley comprising a pin spotting and respotting table, means mounting said table for movement to and from said alley, a plurality of triangularly arranged pin spotting units mounted on said table, each of said units including a set of opposed individually operated pin holding trap doors, means normally positioning said trap doors in substantially the same horizontal plane, means for positioning a bowling pin in each of said pin spotting units in upright position with the base of each pin resting on the upper surface of said trap doors, selectively operated means for lowering said table to pin discharging position adjacent said alley, mechanism for simultaneously moving each set of trap doors to pin discharging position for spotting said pins on said alley, means for moving said table upwardly to a dwell position until the first ball of a frame is rolled, means for actuating said means for lowering said table to position the under surfaces of said individually operated trap doors in clamping relationship with any standing on or off-spot pins on said alley, triangularly arranged opposed pin gripping members mounted on said table beneath the under surfaces of said trap doors, and means operative while any standing on or off-spot pins are clamped by said under surfaces of said trap doors on said alley for actuating said pin gripping members to grip and hold said clamped pins for subsequent lifting and respotting in said on or off-spot positions.

4. A bowling pin spotting machine for use with a bowling alley comprising a pin spotting and respotting table, means mounting said table for substantially vertical movement to and from said alley, a plurality of triangularly arranged pin spotting units mounted on said table, each of said units including an individually operated set of opposed pin supporting trap doors, means normally positioning said trap doors in substantially the same horizontal plane, means for positioning bowling pins in said pin spotting units in upright position with the base of each pin resting loosely on the upper surface of said trap doors, a resilient clamping pad secured to the underside of each of said trap doors, triangularly arranged opposed pin gripping members mounted on said table beneath the under surfaces of said trap doors, sequence control mechanism including means for lowering said table to pin discharging position adjacent said alley, mechanism for simultaneously moving each set of trap doors to pin discharging position for spotting said pins on said alley, means for moving said table upwardly to a dwell position until the first ball of a frame is rolled, means for again actuating said means for lowering said table to engage said resilient pads on said underside of each of said trap doors in clamping relationship with any standing on or off-spot pins on said alley; and means operative while said standing on or off-spot pins are clamped by said resilient pads on the undersides of said trap doors to said alley for actuating said pin gripping members to grip and hold said clamped pins for lifting and respotting in said on or off-spot positions.

5. In a bowling pin spotting machine for use with a bowling alley, a pin spotting and respotting table, means mounting said table for movement to and from said alley for spotting and respotting bowling pins on said alley, a plurality of triangularly arranged pin spotting units each having at least one individually operated pivotally downwardly movable pin supporting, guiding, and clamping member mounted on said table, each of said members being provided on its upper surface with a pin positioning and guiding device, and a compressible pin head clamping element on its under surface, selectively operated mechanism for moving said table in a straight-line substantially vertical path of movement to a pin spotting position or a pin respotting position relative to said alley, means operative at said spotting position for displacing said members relative to pins supported thereon to effect the delivery of said pins by said guides on said members into spotted playing position on said alley, and means operative, when said table is located in said respotting position, for causing said clamping elements to clamp any standing on or off-spot pins upon said alley.

6. In a bowling pin spotting machine, a table, bowling pin spotting devices mounted on said table, bowling pin respotting devices mounted on said table, selectively actuated mechanism for lowering and raising said table relative to a bowling alley including means for locating said table at a pin spotting position adjacent said alley, means for locating said table at a pin respotting position above said alley, selectively operated mechanism for holding said table at said last-named position against downward movement when pins standing on said alley are to be lifted and respotted thereon, a counterweight for said table, a shaft, supports for said shaft, endless flexible members connecting said counterweight to said table, spaced rotatable devices on said shaft tracked by said flexible members, a locking member attached to one of said devices on said shaft, a locking arm, and means forming a part of said selectively operated mechanism operative in response to the presence of pins standing on said alley after any ball but the last ball of a frame is rolled for moving said locking arm into engagement with said locking member for locking said table against movement out of said respotting position.

7. In a bowling pin spotting machine, a device for placing bowling pins on the playing bed of a bowling alley comprising a frame, a shaft carried by said frame, an arm loosely mounted adjacent each end of said shaft, pin spotter units carried by said frame, pin respotting units carried by said frame and in substantial axial alignment with said spotter units, a drive shaft, a lever fixed to said shaft adjacent each end thereof, a link connecting each of said levers to one of said arms, means for driving said drive shaft to travel said levers in one angular direction to lower and raise said frame, and means responsive to the travel of said levers to effect angular movement of said arms in opposite directions, selectively actuated means operated by one of said arms in response to the movement thereof in one direction for actuating said respotting units in response to the rolling of the first ball of a frame to grip any standing pins for lifting and respotting, and means connected to said frame and actuated by the downward and upward movement of said frame for selectively actuating said spotter units in response to the rolling of the last ball of each frame.

8. In a bowling pin spotting machine, a device for placing bowling pins on the playing bed of a bowling alley, comprising a frame, spotter units on said frame, respotter units having opposed pin grippers also mounted on said frame, a shaft carried by said frame, an arm loosely mounted on said shaft, a driven shaft, a lever fixed to said driven shaft, a link connecting said arm with said lever, means for driving said driven shaft to lower and raise said frame with a simple harmonic motion to and from said bed, selectively actuated means operated by said arm for acuating said grippers of said respotters for gripping and lifting any pins remaining standing on said alley after all balls but the last ball of a frame are rolled, selectively actuated means for locking and unlocking said grippers, and means carried by said frame and actuated by the downward and upward movement of said frame in response to the rolling of the last ball of a frame for selectively operating said spotter units to spot a new set of pins on said alley bed.

9. In a bowling pin spotting machine having a device for spotting and respotting bowling pins on the playing bed of an alley, control mechanism operative after each ball of a frame is rolled for moving said device to and from said bed for respotting any pins remaining standing after the first ball of a frame is rolled, and for spotting a new set of pins on said alley bed after the second ball of a frame is rolled, said control mechanism comprising an electric circuit, a plurality of switches in said circuit, a cam shaft, a plurality of control cams on said shaft, means for driving said shaft one-half revolution each cycle of said machine for causing said cams to selectively operate said switches in said circuit, a latch relay in said circuit, cam means operative subsequent to the rolling of each first ball of a frame for energizing said relay to maintain said circuit for an operating cycle of said machine, and means operative in response to the rolling of the last ball of a frame for deenergizing said relay.

10. In a bowling pin spotting machine, a pin spotting device including a frame, a plurality of pin spotters mounted on said frame, and a plurality of pin respotters mounted on said frame beneath and in substantial axial alignment with said spotters; mechanism operative after each ball of a frame is rolled for lowering and raising said frame with a simple harmonic motion to and from a bowling alley, said mechanism including a drive shaft, spaced levers fixed to said shaft, operating arms swingably mounted on said device, links connecting said arms to said levers and supporting said device for movement to and from said alley, means for moving said shaft continuously during each cycle of operation after a ball is rolled to locate said frame at a spotting position, a dwell position and a respotting position, and a selectively operated device operative at said last-named position, comprising means for preventing further downward movement of said frame, and means for continuing the operation of said shaft when said further downward movement of said frame is prevented.

11. In a bowling pin spotting machine for use with a bowling alley, a pin spotting and respotting table, a plurality of triangularly arranged pin spotting units mounted on said table, each of said spotting units including a plurality of hinged individually vertically movable bowling pin holding and guiding supports, means for receiving and guiding a pin into seated relationship on said supports of each of said units, pin clamping means located beneath said supports, a plurality of triangularly arranged pin respotting units mounted on said table beneath said supports with the vertical axis of each respotting units substantially in alignment with the vertical axis of each spotting unit, mechanism for raising and lowering said table relative to said bowling alley, selectively operated mechanism operative when all standing pins are knocked down by the first ball of a frame and after the last ball of each frame for actuating said spotting units to move said supports out of supporting relationship with each pin seated on said supports in each of said units for guiding and depositing said pins in spotted arrangement on said alley, and means for operating said mechanism for lowering said table to position said pin clamping means in clamping engagement with the head ends of standing on or off-spot bowling pins after the throwing of the first ball of a frame.

12. In a bowling pin spotting machine for use with a bowling alley, a pin spotting and respotting table, a plurality of triangularly arranged pin spotting units carried by said table, each of said units including a plurality of oppositely movable bowling pin supporting members, means for receiving and guiding pins into seated relationship on said members, a plurality of bowling pin respotting units mounted in triangular arrangement on said table beneath said spotting units and in substantial axial alignment therewith, including pin clamping means and a pair of opposed gripping bars, means supporting said bars for substantially straight line movement to and from each other, mechanism operative when all standing pins are knocked down by the first ball of a frame or after the last ball of a frame is rolled for actuating all of said spotting units to move said supporting members apart for delivering pins in said units onto said alley, and mechanism for actuating said respotting units for moving said opposed gripping bars towards each other to grip and hold standing pins clamped by said clamping means for lifting during removal of fallen pins from said alley, and respotting said pins in their on or off-spot positions on said alley.

13. In a bowling pin spotting machine for use with a bowling alley, a pin spotting and respotting table, a plurality of triangularly arranged pin spotting units carried by said table, each of said units including a plurality of oppositely movable bowling pin supporting members, a plurality of bowling pin respotting units mounted in triangular arrangement on said table beneath said spotting units and in axial alignment therewith, including a pair of opposed gripping bars, means for maintaining said bars in inoperative open position when pins are to be delivered downwardly and spotted on said alley, mechanism operative when pins are to be spotted for actuating all of said spotting units to move said supporting members apart for delivering pins in said units onto said alley, pin guide means operative in response to said downward movement of said members for guiding said pins into proper spotted position on said alley, and mechanism for actuating said respotting units for moving said bars towards each other to grip and hold standing pins for lifting during removal of fallen pins from said alley, and respotting said pins in their on or off-spot positions on said alley.

14. In a bowling pin spotting machine for use with a bowling alley, a pin spotting and respotting table, means mounting said table for movement to and from said alley for spotting and respotting bowling pins on said alley, and a plurality of triangularly arranged sets of movable pin supporting, and guiding members mounted on said table, means for receiving and guiding a pin into seated relationship on said members of said sets of members, each set comprising at least two members movable in opposite directions to release a pin supported thereby for delivery in spotted position on said alley, said members being operative to clamp a pin upon a bowling alley by their under surface, and means for operating said members.

15. In a bowling pin spotting machine for use with a bowling alley, a pin spotting and respotting table, means mounting said table for movement to and from said alley for spotting and respotting bowling pins on said alley, and a plurality of triangularly arranged sets of individually operable oppositely movable pin supporting members mounted on said table, said sets of members being constructed and arranged to support the base end of an upright bowling pin, pin clamping means located beneath said members, means operative when said table is located in position for spotting pins for moving said members in opposite directions away from said base end of said pin and for guiding said pin into spotted position on said alley, and means for maintaining said members in pin supporting position when said clamping means are clamping standing pins to be respotted on said alley.

16. In a bowling pin spotting machine for use with a bowling alley, a pin spotting and respotting table, means mounting said table for movement to and from said alley for spotting and respotting bowling pins on said alley, a plurality of triangularly arranged sets of oppositely movable pin supporting and guiding members mounted on said table, means for receiving and guiding a pin into seated relationship with said members of said sets of members, each of said members being formed with a pin positioning and guiding device, pin head clamping elements located beneath said members, selectively operated mechanism for moving said table in a straight-line substantially vertical path of movement to a pin spotting position or a pin respotting position relative to said alley, means operative at said spotting position for displacing said members in opposite directions of movement relative to pins supported thereby to effect the delivery of said pins in spotted playing position on said alley, means operative when said table is located in said respotting position for holding said clamping elements in pin clamping position to clamp any standing on or off-spot pins upon said alley, triangularly arranged sets of grippers mounted directly beneath said supporting and clamping elements, and means for operating said sets of grippers when said standing on or off-spot pins are clamped by said elements upon said alley to grip and hold said pins for lifting and respotting.

17. A bowling pin spotting machine for use with a bowling alley comprising a pin spotting and respotting table, means mounting said table for movement to and from a bowling alley for spotting and respotting bowling pins on said alley, a plurality of triangularly arranged mechanisms each including a bowling pin spotting device mounted on said table, and a respotting unit operatively associated with each of said devices, a plurality of individually operated oppositely movable pin supporting, guiding, and clamping plates operatively associated with each of said mechanisms, means normally maintaining all of said plates in substantially horizontal pin supporting and clamping position, and selectively operable mechanism for moving all of said plates simultaneously out of engagement with bowling pins supported thereon for effecting the delivery of said pins in spotted triangular playing arrangement on said alley.

18. A spotting unit for a bowling pin spotting machine comprising a bowling pin guiding and positioning member, means mounting said member with its longitudinal axis substantially vertical, a plurality of opposed pin supporting and clamping plates, said plates having an upper surface adapted to support the base of a bowling pin, and a lower surface for clamping a standing pin on a bowling alley, a hinge supporting each of said plates, means normally maintaining said plates located in a plane substantially at right angles with the longitudinal axis of said member for loosely supporting the base of an upright bowling pin located on said upper surface of said plates and encircled by said member, means for moving said plates out of supporting relationship with a bowling pin supported thereon for guiding and delivering said pin in spotted position onto said alley, a pair of opposed elongated gripper bars located beneath said supporting and clamping plates, means mounting said bars for substantially straight line movement to and from each other in a plane substantially at right angles with the longitudinal axis of said member, means normally locating said bars in inoperative position when said pin is discharged by said plates onto said alley, and means for moving said bars towards each other into gripping position when a standing pin is clamped by the underside of said plates upon said alley.

19. In a bowling pin spotting machine, a frame, means mounting said frame for substantially straight-line vertical movement between a pin receiving station and selected positions above a bowling alley, said positions including a pin setting position and a pin respotting position, a plurality of triangularly arranged pin spotting units mounted on said frame, a plurality of pin respotting units mounted on said frame beneath said spotting units with the vertical axis of each respotting unit aligned with the vertical axis of one of said spotting units, a set of individually operable oppositely movable pin supporting and guiding members mounted in each of said spotting units, means for receiving and guiding pins into seated relationship with said members in said units, pin clamping means located beneath said units, means normally maintaining said members in planes substantially perpendicular to said vertical axes of said vertically aligned units to support the base ends of pins resting thereon, selectively actuated operating means for moving said members in opposite directions and out of engagement with pins supported thereby for effecting the guided delivery of said pins onto said alley, opposed grippers in each of said respotter units, means mounting said grippers for movement to and from each other in planes substantially perpendicular to said vertical axes of said aligned units, and operating mechanism for each of said opposed grippers, said last-named mechanism including operating connections for normally moving said grippers substantially equal distances into gripping engagement with on-spot standing pins, and means causing said grippers to move unequal distances for gripping off-spot pins.

20. In a bowling pin spotting machine, a table for spotting bowling pins on the playing bed of a bowling alley, a plurality of pin spotting units mounted in pin playing arrangement on said table, a set of movable pin supporting and guiding plates forming a part of each of said units, a plurality of respotting devices on said table, each of said devices being located beneath one of said pin spotting units, said plates coacting with said respotting devices to clamp pins to be held by said respotting devices for respotting on said alley, a driving shaft, a shaft on said table, an operating lever attached to said driving shaft, an arm loose on said second-named shaft, a link connecting said lever and said arm, interconnected operating mechanism for said sets of plates including a primary operating shaft, a lever fixed to said shaft, a link connected to said lever, a bracket on said table, a second link, said second link being pivotally connected to said brackets, a common pivot pin joining said links, a cam follower mounted on said pin, an operating cam tracked by said follower, said cam having two spaced vertical elongated sections, means for driving said driving shaft after each ball of a frame is rolled to lower said table to test for the presence or absence of standing pins and then raise said device, and selective mechanism operated in response to the presence of standing pins on said alley bed for limiting the movement of said cam follower to one of said sections only to maintain said plate operating mechanism inoperative, and operative in response to the absence of standing pins for causing said cam follower to travel on both of said sections to operate said interconnected operating mechanism of said pin spotting units and cause said plates to guide and deliver a set of pins onto said alley bed.

21. In a bowling pin spotting machine, a pin spotting and respotting device comprising a frame, a plurality of pin spotter units and a plurality of pin respotting units mounted on said frame, a set of individually operated movable pin supporting and guiding plates associated with each of said pin spotter units, actuating shafts for said plates, including a primary actuating shaft, interconnected operating elements connecting said shafts for substantially simultaneous operation of all of said sets of plates, a lever fixed to said primary shaft, an operating linkage connected to said lever, a cam follower mounted in said linkage, a pin spotter plate operating cam, a support for said cam, said cam comprising a pivoted elongated substantially vertical cam section having an intermediate angular portion, and a fixed elongated cam section having a terminal angular section, selective mechanism operated in response to the presence of standing pins after the first ball of a frame is rolled for causing said cam follower to travel in opposite directions along only said substantially vertical cam section of said cam, means operative in response to the movement of said cam follower along said vertical section of said cam after the first ball of a frame is rolled for actuating said respotting units for lifting and respotting on and off-spot pins, and selective means operative in response to the rolling of the last ball of a frame or a strike for moving said cam follower along said angular portion of said pivoted cam section to swing said cam and effect a horizontal displacement of said cam follower onto said fixed elongated cam section and to move the follower therealong, whereby to rock said primary actuating shaft to effect the delivery of pins in said spotter units onto said alley, said terminal angular portion of said fixed cam sections being operative in response to the movement of said cam follower therealong to cause said follower to rock said primary actuating shaft to its inoperative position, and means operative when said cam follower moves off said last-named angular section for restoring said pivoted cam to its normal substantially vertical operating position.

22. In a bowling pin spotting machine for use with a bowling alley, a pin spotting and respotting table, means mounting said table for movement to and from said alley for spotting and respotting bowling pins on said alley, a plurality of triangularly arranged sets of movable pin supporting and guiding members, means for receiving and guiding a pin into seated relationship with said members of said sets of members, clamping devices mounted on said table beneath and connected to said members, means normally positioning each of said sets of members to support pins to be spotted, and to position said clamping devices in a substantially horizontal plane for clamping pins to be respotted upon said alley, and means for limiting upward movement of said devices out of said plane when standing on or off-spot pins are clamped by said devices upon said alley, selectively operated mechanism for moving said table in a straight-line substantially vertical path of movement to a pin spotting position or a pin respotting position relative to said alley, means operative at said spotting position for displacing said members relative to pins supported thereon to effect the guided delivery of said pins in spotted playing position on said alley, means operative when said table is located in said respotting position for causing said devices to clamp any standing on or off-spot pins upon said alley, triangularly arranged sets of grippers mounted directly beneath said clamping devices, and means for operating said sets of grippers when said standing on or off-spot pins are clamped by said devices upon said alley to grip and hold said pins for lifting and respotting.

References Cited in the file of this patent

UNITED STATES PATENTS

| Number | Name | Date |
|---|---|---|
| 975,445 | McFarland | Nov. 15, 1910 |
| 1,335,638 | Barrett | Mar. 30, 1920 |
| 1,573,643 | Proch | Feb. 16, 1926 |
| 1,692,796 | Bishop | Nov. 20, 1928 |
| 1,784,084 | Williams | Dec. 9, 1930 |
| 1,833,814 | Backus | Nov. 24, 1931 |
| 2,221,697 | Ball | Nov. 12, 1940 |
| 2,229,852 | Kaufman | Jan. 28, 1941 |
| 2,231,473 | Kaufman | Feb. 11, 1941 |
| 2,283,613 | Schmidt | May 19, 1942 |
| 2,300,802 | Parra et al. | Nov. 3, 1942 |
| 2,316,183 | Patterson | Apr. 13, 1943 |
| 2,341,475 | Parra et al. | Feb. 8, 1944 |
| 2,353,189 | Rundell | July 11, 1944 |
| 2,450,249 | Murphy | Sept. 28, 1948 |
| 2,531,429 | Hedenskoog | Nov. 28, 1950 |
| 2,591,265 | Johns et al. | Apr. 1, 1952 |
| 2,616,693 | Montooth | Nov. 4, 1952 |
| 2,621,961 | Whipple et al. | Dec. 16, 1952 |
| 2,676,016 | Whipple et al. | Apr. 20, 1954 |